United States Patent
Subauste

(10) Patent No.: US 12,522,633 B2
(45) Date of Patent: *Jan. 13, 2026

(54) COMPOSITIONS AND METHODS FOR TREATING CD40-MEDIATED DISEASES

(71) Applicant: Case Western Reserve University, Cleveland, OH (US)

(72) Inventor: Carlos Subauste, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 1322 days.

This patent is subject to a terminal disclaimer.

(21) Appl. No.: 17/221,182

(22) Filed: Apr. 2, 2021

(65) Prior Publication Data

US 2021/0309697 A1 Oct. 7, 2021

Related U.S. Application Data

(63) Continuation-in-part of application No. 16/890,486, filed on Jun. 2, 2020, now Pat. No. 12,319,726.

(60) Provisional application No. 63/004,026, filed on Apr. 2, 2020.

(51) Int. Cl.
C07K 14/705 (2006.01)
C07K 7/06 (2006.01)
C07K 7/08 (2006.01)
A61K 38/00 (2006.01)

(52) U.S. Cl.
CPC ............. *C07K 7/06* (2013.01); *C07K 7/08* (2013.01); *A61K 38/00* (2013.01); *C07K 2319/10* (2013.01)

(58) Field of Classification Search
None
See application file for complete search history.

(56) References Cited

U.S. PATENT DOCUMENTS

| | | | |
|---|---|---|---|
| 9,486,498 B2 | 11/2016 | Subauste | |
| 10,669,345 B2 * | 6/2020 | Subauste | C07K 16/2878 |
| 2003/0027744 A1 | 2/2003 | Dana et al. | |
| 2004/0087774 A1 | 5/2004 | Goeddel et al. | |
| 2004/0197867 A1 | 10/2004 | Titus et al. | |
| 2005/0272050 A1 | 12/2005 | Mintz et al. | |
| 2011/0142850 A1 * | 6/2011 | Subauste | A61P 29/00 514/17.7 |
| 2017/0051070 A1 * | 2/2017 | Subauste | C07K 14/7151 |

OTHER PUBLICATIONS

Che, H., et al., "Interference with Nuclear Factor Kappa B and c-Jun NH2-Terminal Kinase Signaling by TRAF6C Small Interfering RNA Inhibits Myeloma Cell Proliferation and Enhances Apoptosiss", Oncogen, May 2006, vol. 25, pp. 6520-6527: Abstract, p. 6524.

Inwald, D.P., et al., CD40 is Constitutively Expressed on Platelets and Provides a Novel Mechanism for platelet Activation. Circulation Research. Apr. 2003, vol. 92(9), pp. 1041-1048: abstract.

Lee, H.H., et al., Specifics of CD40 signaling: Involvement of TRAF2 in CD40-Induced NF-kB activation and Intracellular Adhesion Molecule-1 Up-Regulation. Proc. Natl. Acad. Sci. USA, Feb. 1999, vol. 96(4), pp. 1421-1426: abstract; p. 1423.

* cited by examiner

*Primary Examiner* — Michael D Pak
(74) *Attorney, Agent, or Firm* — Tarolli, Sundheim, Covell & Tummino LLP

(57) ABSTRACT

A cell-penetrating peptide includes a membrane transduction domain linked to a CD40-TRAF2,3 blocking peptide that includes an amino acid sequence substantially identical to the amino acid sequence of the TRAF2,3 binding domain to CD40 or a retro-inverso amino acid sequence thereof.

6 Claims, 13 Drawing Sheets

Specification includes a Sequence Listing.

A

B

C

COMPOSITIONS AND METHODS FOR TREATING CD40-MEDIATED DISEASES

RELATED APPLICATION

This application claim priority to U.S. Provisional No. 63/004,026, filed Apr. 2, 2020 and is a Continuation-in-Part of U.S. application Ser. No. 16/890,486, filed Jun. 2, 2020, the subject matter of which are incorporated herein by reference in their entirety.

TECHNICAL FIELD

The present invention relates generally to compositions and methods for treating CD40-mediated diseases, and more particularly to methods for treating CD40-mediated inflammatory diseases.

BACKGROUND

CD40 is a member of the TNF receptor superfamily that is expressed on a wide variety of cells including antigen presenting cells (e.g., dendritic cells, macrophages, B cells) and non-immune cells, such as endothelial cells, smooth muscle cells, fibroblasts, epithelial cells, astrocytes and neurons. Its counter-receptor, CD154 (CD40 ligand), is expressed primarily on activated CD4+ T cells; although, other cells, such as platelets can also express CD154.

The interaction between CD40 and CD154 is central to the pathogenesis of numerous diseases including, for example, atherosclerosis, neurodegenerative disorders (e.g., Alzheimer's disease, cerebral ischemia, multiple sclerosis, amyotrophic lateral sclerosis) various autoimmune disorders (e.g., inflammatory bowel disease, systemic lupus erythematosus, rheumatoid arthritis, graft rejection, idiopathic thrombocytopenic aurpura, inflammatory myopathies, etc.), rejection of transplanted organs, and ischemia. Numerous studies have demonstrated that in vivo blockade of the CD40-CD154 pathway controls these diseases in animals. Another role of CD40-CD154 interaction is to activate mechanisms of resistance against a broad variety of pathogens. This is important because approaches to control CD40-mediated diseases should ideally manipulate this pathway so that mechanisms of host resistance remain largely intact.

The relevance of CD40-CD154 interaction in the pathogenesis of numerous diseases has led to clinical trials which examined the effects of blocking this pathway. While generalized blockade of CD40 signaling by administration of an anti-CD154 monoclonal antibody appeared effective, the studies were discontinued because anti-CD154 monoclonal antibodies caused platelet aggregation and thrombosis. These effects are likely caused by activation of platelets via engagement of CD154 expressed on their membrane. Thus, approaches to target CD40 for therapy have not been feasible, and indiscriminate inhibition of the CD40 pathway may cause susceptibility to opportunistic infections.

SUMMARY

Embodiments described herein relate generally to compositions and methods for treating CD40-mediated diseases, and more particularly to compositions and methods for treating CD40-mediated inflammatory diseases.

In some embodiments, the method can include administering to cells expressing CD40 of the subject a therapeutically effective amount of a composition that includes a cell-penetrating peptide, which inhibits binding of TNF receptor associated factor 2 (TRAF2) to a cytoplasmic portion of CD40 (i.e., a cell-penetrating CD40-TRAF2,3 blocking peptide). The cell-penetrating polypeptide does not inhibit binding of CD40 ligand (CD40L) to CD40 of the cells. The composition including the cell-penetrating polypeptide can be administered to the cells at an amount effective to inhibit at least one of the following pro-inflammatory responses: upregulation of VCAM-1 or ICAM-1 from the cells, or production of chemokines such as MCP-1 or CXCL1, or production of tissue factor or metalloproteinases, or nitric oxide, or prostaglandins from the cells. Advantageously, the cell-penetrating polypeptide does not promote platelet aggregation or thrombosis in the subject, and the cell-mediated immune response of the subject is substantially unimpaired.

In some embodiments, the CD40-mediated disease can include an inflammatory disease, a disorder of the immune system, or a disease comprising malignant B-cells. The inflammatory disease can include, for example, at least one of an ischemic injury, atherogenic disease, a neurodegenerative disease, diabetes mellitus, retinopathy (e.g., diabetic retinopathy or glaucoma), inflammatory bowel disease (IBD), an autoimmune disorder (e.g., systemic lupus erythematosus (SLE), rheumatoid arthritis, psoriasis, vasculitis, etc.), rejection of transplanted organs, diabetic nephropathy, and atherosclerosis.

In some embodiments, the CD40-expressing cell can include an antigen-presenting cell (APC) including B-cell as well as a non-immune cells such as endothelial cells, smooth muscle cells, fibroblasts, epithelial cells, astrocytes, neurons, retinal cells, and Müller cells.

In some embodiments, the cell-penetrating CD40-TRAF2,3 blocking peptide can include a membrane transduction domain (or cell-penetrating peptide) and a CD40-TRAF2,3 blocking peptide that includes an amino acid sequence substantially identical to the amino acid sequence of the TRAF2,3 binding domain or a retro-inverso amino acid sequence thereof, wherein the CD40-TRAF2,3 blocking peptide does not include the amino acid sequence of PVQET (SEQ ID NO: 10) or a retro-inverso amino acid sequence thereof.

Other embodiments described herein relate to a method for treating a CD40-mediated disease in a subject that includes administering to cells expressing CD40 of the subject a therapeutically effective amount of a cell-penetrating CD40-TRAF2,3 blocking peptide and a cell-penetrating polypeptide that competitively inhibits binding of TRAF6 to the TRAF6 binding domain of CD40 (i.e., a cell-penetrating CD40-TRAF6 blocking peptide). In some embodiments, the cell-penetrating CD40-TRAF6 blocking peptide inhibits the production or activity of interleukin-1 (IL-1). The cell-penetrating CD40-TRAF2,3 blocking peptide and the cell-penetrating CD40-TRAF6 blocking peptide do not inhibit binding of CD40L to CD40 of the cells. The cell-penetrating CD40-TRAF2,3 blocking peptide can be administered to the cells at an amount effective to inhibit at least one of the following pro-inflammatory responses: upregulation of VCAM-1 or ICAM-1 from the cells, or production of chemokines such as MCP-1 or CXCL1 or production of tissue factor, or metalloproteinases, or nitric oxide, or prostaglandins from the cells. Advantageously, the cell-penetrating CD40-TRAF2,3 blocking peptide and the cell-penetrating CD40-TRAF6 blocking peptide do not promote platelet aggregation or thrombosis in the subject and the cell-mediated immune response of the subject is substantially unimpaired.

In some embodiments, the cell-penetrating CD40-TRAF2,3 blocking peptide can include a membrane transduction domain and a CD40-TRAF2,3 blocking peptide that includes an amino acid sequence substantially identical to the amino acid sequence of the TRAF2,3 binding domain or a retro-inverso amino acid sequence thereof, wherein the CD40-TRAF2,3 blocking peptide does not include the amino acid sequence of PVQET (SEQ ID NO: 10) or a retro-inverso amino acid sequence thereof.

In some embodiments, the cell-penetrating CD40-TRAF6 blocking peptide can include a membrane transduction domain (or cell penetrating peptide) and a CD40-TRAF2,3 blocking peptide that includes an amino acid sequence substantially identical to the amino acid sequence of the TRAF6 binding domain or a retro-inverso amino acid sequence thereof.

In some embodiments, the CD40-mediated disease can include an inflammatory disease, a disorder of the immune system, or a disease comprising malignant B-cells. The inflammatory disease can include, for example, at least one of an ischemic injury, atherogenic disease, a neurodegenerative disease, diabetes mellitus, retinopathy (e.g., diabetic retinopathy or glaucoma), inflammatory bowel disease (IBD), an autoimmune disorder (e.g., systemic lupus erythematosus (SLE), rheumatoid arthritis, psoriasis, vasculitis, etc.), rejection of transplanted organs, diabetic nephropathy, and atherosclerosis.

In some embodiments, the CD40-expressing cell can include an antigen-presenting cell (APC) including B-cell as well as a non-immune cells selected from the group consisting of endothelial cells, smooth muscle cells, fibroblasts, epithelial cells, astrocytes, neurons, and Müller cells.

One non-ischemic eye from a B6 mouse was given an arbitrary value of 1 and data are expressed as fold-increase compared to this animal. Horizontal bars represent Mean±SEM (9-12 mice per group). *** P<0.001 by ANOVA. B. Retinal sections were incubated with Tomato Lectin (labels endothelial cells) plus either anti-ICAM-1 or anti-CXCL1 Ab. C, Retinal sections were incubated with anti-Vimentin Ab (labels Müller cells) plus either anti-NOS2 or anti-CXCL1 Ab. Protein expression at the level of Müller cells stalks. Original magnification X600. GCL=Ganglion cell layer; IPL=Inner plexiform layer; INL=Inner nuclear layer; OPL=Outer plexiform layer; ONL=Outer nuclear layer. Scale bar, 10 μm. 6 mice/group.

FIG. 6(A-D) illustrate images and plots showing ri CD40-TRAF2,3 blocking peptide protects against cell loss in the GCL and inflammation when administered after retinal I/R. One eye from each B6 mouse was subjected to I/R. Non-ischemic eyes were used as controls. Eyes that were subjected to I/R received either ri control peptide or ri CD40-TRAF2,3 blocking peptide (1 μg) 90 min after increase in IOP. Eyes were collected 2 d after I/R. A. Administration of the blocking peptide protects against cell loss in the ganglion cell layer and infiltration by leukocytes (arrowhead). Original magnification X400. Scale bar, 50 □m. B, Number of cells in the GCL and β-III tubulin+ cells per mm. C. Number of MPO+ leukocytes in the inner retina and vitreous per section. D. mRNA levels of ICAM-1, CXCL1, NOS2, COX-2, TNF-α and IL-1β were assessed by quantitative real time PCR as above. Horizontal bars represent mean±SEM (6-9 mice per group).  P<0.01; * P<0.001 by ANOVA.

FIG. 7(A-B) illustrate plots and images showing both the ri CD40-TRAF2,3 and CD40-TRAF6 blocking peptides impair retinal expression of inflammatory molecules induced by I/R but the ri CD40-TRAF6 blocking peptide exacerbates an infectious retinitis. A, Eyes subjected to I/R were treated intravitreously with or without ri control peptide (Ctr P), ri CD40-TRAF2,3 blocking peptide (T2,3 BP) or ri CD40-TRAF6 blocking peptide (T6 BP; 1 μg) 1 hr. prior to increase in IOP. Eyes were collected 2 d after I/R. mRNA levels of were assessed by quantitative real time PCR as above. B, B6 and Cd40$^{-/-}$ mice were infected with T. gondii tissue cysts. B6 mice received peptides intravitreally 4 days after infection. Eyes were collected 14 d post-infection. Levels of T. gondii B1 gene expression were assessed by real time PCR. Eyes from infected B6 mice that received the CD40-TRAF6 blocking peptide or infected Cd40-mice showed prominent disruption of retinal architecture (asterix), perivascular (arrowhead) and vitreal inflammation (arrow). H&E; X200. Bar, 50 μm. Histopathology scores for vitreal inflammation (VI), perivascular inflammation (PV) and disruption of retinal architecture (DA). Graphs represent mean±SEM of 8 mice per group.  P<0.01; * P<0.001 by ANOVA.

Figure 8:
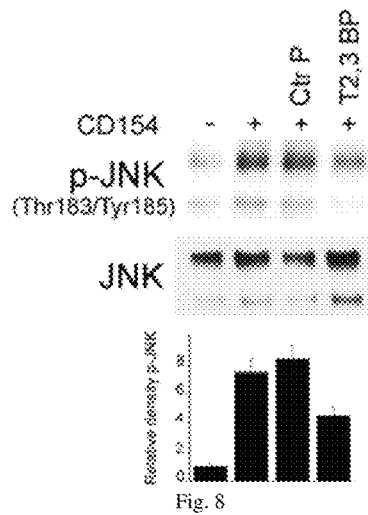

FIG. 8 illustrates an immunoblot and graph showing ri CD40-TRAF2,3 blocking peptide inhibits CD40-driven JNK phosphorylation. Human retinal Müller cells were treated with ri control peptide (Ctr P) or ri CD40-TRAF2,3 blocking peptide (T2,3 BP; both at 1 μM) followed by stimulation with CD154 for 15 min. Total JNK and phospho-Thr183/Tyr185 JNK were assessed by immunoblot. Relative density of phospho-JNK was obtained by normalization to total JNK. Relative density of phospho-JNK for the unstimulated sample was given a value of 1. Densitometry data represent means+/−SD of 3 independent experiments.

Figure 9:
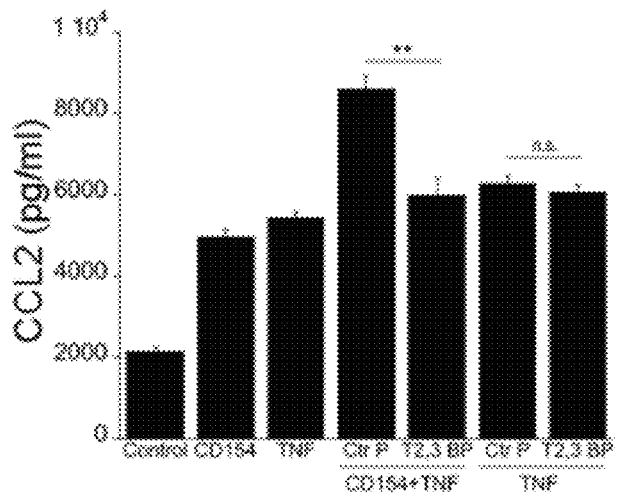

FIG. 9 illustrates a graph showing ri CD40-TRAF2,3 blocking peptide inhibits CD40-driven chemokine upregulation. Human retinal endothelial cells were treated with ri control peptide (Ctr P) or ri CD40-TRAF2.3 blocking peptide (T2,3 BP; both at 1 μM) followed by stimulation with CD154 with or without TNF-α (30 pg/ml) for 24 h. Secretion of CCL2 was examined at 24 h by ELISA. Data shown represent Mean+/−SD of triplicate samples. Results are representative of 3 independent experiments. ** P<0.01 by ANOVA.

Figure 10:
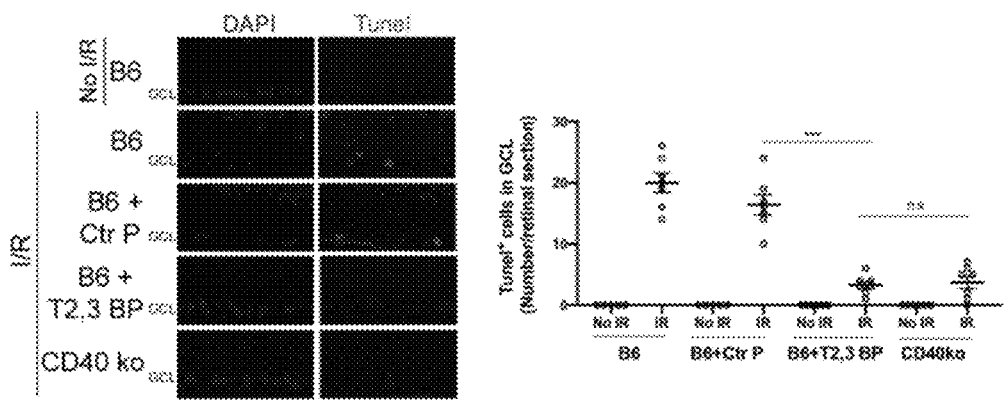

FIG. 10 illustrates a graph showing ri CD40-TRAF2,3 blocking peptide protects against programmed cell death in the GCL of retinas subjected to I/R. One eye from each 86 and Cd40−/− mouse was subjected to I/R. Contralateral non-ischemic eye was used as control. Eyes subjected to I/R in 86 mice were treated intravitreously with or without ri control peptide (Ctr P) or ri CD40-TRAF2,3 blocking peptide (T2,3 BP) 1 hr. prior to increase in IOP. Eyes were collected 2 dafter I/R and were stained with ApopTag Red, In situ Apoptosis Detection kit. Original magnification X400. Scale bar, 50 μm. GCL=Ganglion cell layer). Tunel+ cells in the GCL were counted in whole retinal sections. Horizontal bars represent mean+/−SEM (7 mice per group) .*** P<0.001 by ANOVA.

FIG. 11(A-C) illustrate graphs showing ri CD40-TRAF6 blocking peptide inhibits CD40-TRAF6 signaling, impairs CD40-driven adhesion molecule upregulation and CD40-induced toxoplasmacidal activity. A. Mouse endothelial cells (mHEVc) that express an NF-KB response element that drives transcription of a luciferase reporter plus either hmCD40//T2,3 or hmCD40 11T6 were pre-incubated with ri Tat peptide (Ctr P) or ri CD40-TRAF6 blocking peptide (T6 BP; both at 1 μM) or medium alone followed by stimulation with human CD154. Data are expressed as fold-increase in normalized luciferase activity in cells stimulated with CD154 compared to cells treated with respective peptide in the absence of CD154. B, Mouse retinal endothelial cells were treated with ri Tat peptide (Ctr P), ri CD40-TRAF2,3 (T2,3 BP) or ri CD40-TRAF6 blocking peptide (T6 BP; all 1 μM) followed by incubation with a stimulatory anti-CD40 mAb for 24 h. Expression of ICAM-1 was assessed by flow cytometry. C, Mouse retinal endothelial cells were treated as above and infected with T gondii tachyzoites. The numbers of vacuoles and tachyzoites per 100 cells were assessed at 24 hr. Data shown represent mean +/−SD of triplicate samples. Results are representative of 3 independent experiments. ** P<0.01 by ANOVA.

FIG. 12(A-B) illustrate graphs showing the effect of CD40 and blocking peptides on the expression of IL-12, IFN-γ, TNF-α and NOS2 mRNA levels in the eyes of T. gondii-infected mice and on serum anti-T. gondii IgG levels. 86 and Cd40−/− mice were infected with T gondii tissue cysts. 86 mice received peptides intravitreally in both eyes 4 days after infection. A, Eyes were collected 14 d post-infection. Levels of IL-12 p40, IFN-y, TNF-a and NOS2 mRNA were assessed by real time PCR. One infected 86 mouse was given an arbitrary value of 1. Data are expressed as fold-increase compared to this animal. Each group contained 4-7mice. B, Serum anti-T gondii IgG titers at 14 d post-infection. Results are shown as the mean +/−SEM.

FIG. 13(A-D) illustrate plots showing the ri CD40-TRAF6 but not the ri CD40-TRAF2,3 blocking peptide impairs IL-12 p70 production and dendritic cell activation after systemic administration of stimulatory anti-CD40 mAb. B6 mice were injected i.p. with 100 μg of stimulatory anti-CD40 mAb or PBS. Mice received peptides (10 μg/kg i.p.) 3 h prior to anti-CD40 mAb. A, Serum levels of IL-12 p70 were assessed by ELISA after 24 hr. B-0, Splenocytes were isolated 48 h after administration of anti-CD40 mAb and subjected to flow cytometric analysis. B. Dot plots show gating strategy for dendritic cells. C. Expression of CD80, CD86 and MHC class II were assessed on gated dendritic cells. D. Expression of CD80 and CD86 on gated dendritic cells after administration of peptides. Results show median+/−SEM of 5-7 mice per group and are representative of 3 independent experiments. * P<0.05; ** P<0.01 by ANOVA.

DETAILED DESCRIPTION

Methods involving conventional molecular biology techniques are described herein. Such techniques are generally known in the art and are described in detail in methodology treatises, such as Current Protocols in Molecular Biology, ed. Ausubel et al., Greene Publishing and Wiley-Interscience, New York, 1992 (with periodic updates). Unless otherwise defined, all technical terms used herein have the same meaning as commonly understood by one of ordinary skill in the art to which the present invention pertains. Commonly understood definitions of molecular biology terms can be found in, for example, Rieger et al., Glossary of Genetics: Classical and Molecular, 5th Edition, Springer-Verlag: New York, 1991, and Lewin, Genes V. Oxford University Press: New York, 1994. The definitions provided herein are to facilitate understanding of certain terms used frequently herein and are not meant to limit the scope of the present invention.

In the context of the present invention, the term "CD40-mediated disease" refers to an activity of CD40/CD154 (CD40 ligand; CD40L), a signal transduction pathway of CD40/CD154, or an activity or signal transduction pathway that is mediated by CD40/CD154. Thus, a CD40-mediated disease can include a disease where a CD40 activity or signal transduction pathway can be modulated for treatment of a disease. More particularly, the present invention encompasses compositions and methods that modulate a CD40/CD154 activity and/or CD40/CD154 signal transduction pathway to provide a therapeutic benefit or therapeutic activity for treatment of a disease, e.g., an inflammatory disease, disorders of the immune system, or a disease comprising malignant B-cells.

The CD40-mediated disease can include a disease where a CD40 activity or signal transduction pathway can be modulated for treatment of the disease. Examples of CD40-mediated diseases can include, but are not limited to, inflammatory diseases (e.g., atherosclerosis, arteriosclerosis, organ ischemia, rejection of transplanted organs, retinopathy, ischemia-induced retinopathy, diabetes mellitus and complications of this disease, such as diabetic retinopathy, diabetic nephropathy, and diabetic neuropathy), neurodegenerative diseases (e.g., Alzheimer's disease, cerebral ischemia, multiple sclerosis, amyotrophic lateral sclerosis, and Parkinson's disease), autoimmune diseases (e.g., inflammatory bowel disease, systemic lupus erythematosus, rheumatoid arthritis, graft rejection, idiopathic thrombocytopenia purpura, Grave's disease, hemolytic anemia, and inflammatory myopathies), drug-induced autoimmune diseases (e.g., drug-induced lupus, psoriasis, or hyper IgE syndrome), allergic responses (e.g., hay fever or a penicillin allergy), and immune responses to an infectious agent (e.g., a bacterium or virus) as well as diseases or disorders associated with malignant B cells (e.g., B-cell lymphomas).

By "malignant" B cell is intended any neoplastic B cell, including but not limited to B cells derived from lymphomas including low-, intermediate-, and high-grade B-cell lymphomas, immunoblastic lymphomas, non-Hodgkin's lymphomas, Hodgkin's disease, Epstein-Barr Virus (EBV) induced lymphomas, and AIDS-related lymphomas, as well as B-cell acute lymphoblastic leukemias, myelomas, chronic lymphocytic leukemias, acute myeloblastic leukemias, and the like.

As used herein, the term "activity" with reference to CD40 activity refers to a cellular, biological, and/or therapeutic activity or function of CD40. Examples of such activities can include, but are not limited to, signal transduction, interacting or associating with a CD40 ligand or other binding partner (e.g., CD154 or CD40L) or cellular component, and modulating an inflammatory response or process, including atherosclerosis.

As used herein, the term "inflammatory disease" refers to a disease characterized by activation of the immune system to abnormal levels that lead to the disease. An inflammatory disease can include a state in which there is a response to tissue damage, cell injury, an antigen, an infectious disease, and/or some unknown cause. Symptoms of inflammation may include, but are not limited to, cell infiltration and tissue swelling.

As used herein, the term "polypeptide" or "peptide" refers to an oligopeptide, peptide, or protein sequence, or to a fragment, portion, or subunit of any of these, and to naturally occurring or synthetic molecules. The term "polypeptide" also includes amino acids joined to each other by peptide bonds or modified peptide bonds, i.e., peptide isosteres, and may contain any type of modified amino acids. The term "polypeptide" also includes peptides and polypeptide fragments, motifs and the like, glycosylated polypeptides, all "mimetic" and "peptidomimetic" polypeptide forms, and retro-inversion peptides (also referred to as all-D-retro or retro-enantio peptides).

As used herein, the term "polynucleotide" refers to oligonucleotides, nucleotides, or to a fragment of any of these, to DNA or RNA (e.g., mRNA, rRNA, tRNA) of genomic or synthetic origin which may be single-stranded or double-stranded and may represent a sense or antisense strand, to peptide nucleic acids, or to any DNA-like or RNA-like material, natural or synthetic in origin, including, e.g., iRNA, siRNAs, microRNAs, and ribonucleoproteins. The term also encompasses nucleic acids, i.e., oligonucleotides, containing known analogues of natural nucleotides, as well as nucleic acid-like structures with synthetic backbones.

As used herein, the term "antibody" refers to whole antibodies, e.g., of any isotype (IgG, IgA, IgM, IgE, etc.) and includes fragments thereof, which are also specifically reactive with a target polypeptide. Antibodies can be fragmented using conventional techniques and the fragments screened for utility and/or interaction with a specific epitope of interest. Thus, the term includes segments of proteolytically-cleaved or recombinantly-prepared portions of an antibody molecule that are capable of selectively reacting with a certain polypeptide. Non-limiting examples of such proteolytic and/or recombinant fragments include Fab, F(ab')$_2$, Fab', Fv, and single chain antibodies (scFv) containing a V[L] and/or V[H] domain joined by a peptide linker. The scFv's may be covalently or non-covalently linked to form antibodies having two or more binding sites. The term "antibody" also includes polyclonal, monoclonal, or other purified preparations of antibodies, recombinant antibodies, monovalent antibodies, and multivalent antibodies. Antibodies may be humanized and may further include engineered complexes that comprise antibody-derived binding sites, such as diabodies and triabodies.

As used herein, the term "subject" refers to any warm-blooded organism including, but not limited to, human beings, pigs, rats, mice, dogs, goats, sheep, horses, monkeys, apes, rabbits, cattle, etc.

As used herein, the terms "treatment," "treating." or "treat" refer to any treatment of a CD40-mediated disease in a subject including, but not limited to, preventing the disease from developing, inhibiting disease development, arresting development of clinical symptoms associated with the disease, and/or relieving the symptoms associated with the disease.

As used herein, the term "effective amount" refers to a dosage of a composition, which is sufficient to provide treatment for a CD40-mediated disease. The effective amount can vary depending on the subject, the disease being treated, and the treatment being effected.

As used herein, the term "therapeutically effective amount" refers to that amount of a composition that results in amelioration of symptoms or a prolongation of survival in a subject. A therapeutically relevant effect relieves to some extent one or more symptoms of a CD40-mediated disease or condition (e.g., an inflammatory disease) or returns to normal, either partially or completely, one or more physiological or biochemical parameters associated with or causative of the disease.

Embodiments described herein relate generally to compositions and methods for treating CD40-mediated diseases, and more particularly to compositions and methods for treating CD40-mediated inflammatory diseases. It was found that: (1) blocking the function of the TNF receptor associated factor 2.3 (TRAF2.3) binding domains (or sites) and/or TRAF6 binding domains (or sites) of CD40 can impair CD40-induced effector responses associated with the development of inflammation; and (2) simultaneous blockade of the TRAF2,3 binding domain and IL-1ß cooperate to control CD40-driven tissue factor (TF) upregulation. For example, it was found that administering a cell-penetrating CD40-TRAF2,3 blocking peptide to a subject having an ischemia/reperfusion (I/R)-induced retinopathy impaired ICAM-1 upregulation in retinal endothelial cells and CXCL1 upregulation in endothelial and Müller cells. The peptide reduced leukocyte infiltration, upregulation of NOS2/COX-2/TNF-α/IL-1β, and ameliorated neuronal loss, effects that mimic those observed after I/R in Cd40$^{-/-}$ mice. While a cell-penetrating CD40-TRAF6 blocking peptide also diminished I/R-induced inflammation, this peptide (but not the CD40-TRAF2,3 blocking peptide) impaired control of the opportunistic pathogen *Toxoplasma gondii* in the retina. Thus, inhibition of the CD40-TRAF2,3 pathway is a novel and potent approach to reduce CD40-induced inflammation, while likely diminishing the risk of opportunistic infections that would otherwise accompany CD40 inhibition.

In some embodiments, a method for treating a CD40-mediated disease, such as atherosclerosis and retinopathy (e.g., diabetic retinopathy, ischemic retinopathy), in a subject can include administering to a cell expressing CD40 a cell-penetrating CD40-TRAF2.3 blocking peptide that inhibits binding of a native TRAF 2 polypeptide to a cytoplasmic part of CD40. As used herein, the term "cytoplasmic part of CD40" refers to a part of CD40 comprising the 62 carboxy-terminal amino acids of human CD40 (amino acid 216-277), or the homologous mouse sequence, or another homologous sequence with similar biological activity.

The cell can include any immune or non-immune cell of the subject that expresses CD40 on the cell surface. One example of an immune cell that can express CD40 on the cell surface can include an antigen-presenting cell (APC), such as a B-cell. APCs can include any cell that presents on its surface an antigen in association with a MHC or portion thereof, or, one or more non-classical MHC molecules, or a portion thereof. Examples of APCs can include, but are not limited to, Langerhans cells, veiled cells of afferent lymphatics, dendritic cells, interdigitating cells of lymphoid organs, and mononuclear cells, such as macrophages, microglia. Non-immune CD40-expressing cells can include, but are not limited to, endothelial cells, smooth muscle cells, epithelial cells, neurons, Müller cells, retinal cells, and other glial cells, such as astrocytes.

The cell-penetrating CD40-TRAF2,3 blocking peptide is capable of inhibiting binding of a native TRAF 2 to a cytoplasmic part of CD40 (e.g., TRAF 2,3 binding site) but does not inhibit binding of CD40 ligand (CD40L) to CD40 of the cells. The cell-penetrating CD40-TRAF2.3 blocking peptide can inhibit at least one of the following pro-inflammatory responses: upregulation of VCAM-1 or ICAM-1 from the cells, or production of chemokines such as MCP-1 or CXCL1 or production of tissue factor, or metalloproteinases, or nitric oxide, or prostaglandins from the cells. Advantageously, the cell-penetrating CD40-TRAF2,3 blocking peptide does not promote platelet aggregation or thrombosis in the subject and the cell-mediated immune response of the subject is substantially unimpaired.

In some embodiments, the cell-penetrating CD40-TRAF2,3 blocking peptide can include a membrane transduction domain (MTD) polypeptide (or cell-penetrating peptide) linked to a CD40-TRAF2,3 blocking peptide that inhibits binding of CD40 to TRAF2,3. Generally, MTDs consist of positively-charged, short peptide sequences that have the ability to cross a plasma membrane to the cell interior in an energy- and receptor-independent manner (i.e., via endocytosis). For example, the MTD can facilitate uptake of the amino acid sequence substantially homologous to the amino acid sequence of a TRAF binding domain into a cell (e.g., a human or animal cell) or tissue. It should be appreciated however, that MTDs which cross the plasma membrane in ways other than endocytosis are also included within the scope of this disclosure.

Numerous types of MTDs are known in the art and can be included as part of the cell-penetrating polypeptide. For example, the MTD can include Kaposi fibroblast growth factor (K-FGF). In particular, a region of K-FGF, such as the hydrophobic region having the amino acid sequence AAVALLPAVLLALLAP (SEQ ID NO: 1), can be used to facilitate translocation of the amino acid sequence substantially identical to the amino acid sequence of a TRAF binding domain into a cell.

Another example of the MTD can include the VP22 tegument protein of herpes simplex virus type 1 (HSV-1). An important property VP22 is that when applied to a surrounding medium, VP22 may be taken up by cells and accumulate in the nucleus of the cells. Fusion proteins of VP22 conjugated to GFP, thymidine kinase protein, and p53, for example, have been targeted to cells in this manner. The VP22 polypeptide can have an amino acid sequence substantially identical to native mammalian VP22 polypeptide. For example, a VP22 polypeptide can have the amino acid sequence NAATATRGRSAASRPTERPRAPARSASR-PRRPVE (SEQ ID NO: 2). Other amino acid and polynucleotide sequences corresponding to VP22 polypeptides, such as homologs, mutants, variants, and/or fragments thereof are known in the art and are available through the GenBank sequence database, for example.

Another example of the MTD can include the human immunodeficiency virus (HIV) trans-activating protein (Tat). Tat is an 86-102 amino acid long protein involved in HIV replication. Tat can translocate through a plasma membrane and reach the cell nucleus, where it then transactivates the viral genome. One particular sequence of amino acids 48-60 CGRKKRRQRRRPPQC (SEQ ID NO: 3) from Tat is important for translocation, nuclear localization, and trans-activation of cellular genes. Numerous other Tat-derived short membrane translocation domains and sequences have been identified that possess translocation activity. Examples of such domains can include amino acids 37-72 and 49-58 RKKRRQRRR (SEQ ID NO: 4) or YGRKKRRQRRR (SEQ ID NO: 5). Any of these fragments may be used alone or in combination with each other to enable translocation of the cell-penetrating polypeptide into a cell.

Tat-derived polypeptides lacking the cysteine rich region (amino acids 22-36) and the carboxyl terminal domain (amino acids 73-86) have been also found to be particularly effective in translocation. Absence of the cysteine-rich region and the carboxy-terminal domain can prevent spurious trans-activation and disulfide aggregation. In addition, the reduced size of the transport polypeptide can minimize interference with the biological activity of the molecule being transported and increase uptake efficiency. Accordingly, use of MTDs comprising such Tat-derived polypeptides (i.e., those lacking the carboxyl terminal domain and/or the cysteine rich-region) may be used to improve the translocation efficiency of the cell-penetrating polypeptide.

The MTD can alternatively include all or part of the *Drosophila* Antennapedia (Antp) homeodomain (HD) protein. For example, the MTD may comprise the third helix of Antp-HD, which has cell penetration properties. The region responsible for translocation in Antp-HD has been localized to amino acids 43-58 (i.e., the third helix), a 16 amino acid-long peptide rich in basic amino acids. The third helix has the amino acid sequence RQIKIWFQNRRMKWKK (SEQ ID NO: 6). This polypeptide has been used to direct biologically active substances to the cytoplasm and nucleus of cells in culture. Accordingly, the MTD of the present invention may comprise an Antp-HD polypeptide, an Antp-HD homolog, an Antp-HD variant, and/or an Antp-HD fragment, such as a fragment containing the third helix of Antp-HD, for example.

Another example of the MTD can include polypeptides having a high arginine content. For example, polyarginine polypeptides of about 6 to 11 residues in length can have translocating activities similar to Tat (Wender, P. A., et al., Proc. Natl Acad. Sci. USA. 97:13003-13008 (2000); Suzuki et al., 2001; Masayuki et al., 2001; and Han, K., et al., Mol. Cells 12:267-271 (2001)). For example, the polyarginine polypeptides can have structures selected from the group (ZYZ)nZ, (ZY)nZ, (ZYY)nA and (ZYYY)nZ, where Z is L-arginine or D-arginine, Y is an amino acid other than one that contains an amidino or guanidino moiety, and n is an integer ranging from 2 to 10. U.S. Patent Pub. No. 2003/0032593 A1 describes translocating peptides having spaced arginine moieties.

The MTD can include at least one signal sequence. Signal sequences of polypeptides are recognized by acceptor proteins that aid in mobilizing pre-proteins from the translation machinery to the membrane of appropriate intracellular organelles. Signal sequence-based translocators are thought to function by acting as a leader sequence ("leading edge") to carry polypeptides and proteins into cells. The core hydrophobic region of a signal peptide sequence may be used as a carrier for cellular import of, for example, intracellular proteins. Synthetic membrane translocation domains and amino acid sequences containing such hydrophobic regions may also be able to translocate into cells. One particular hydrophobic region, known as the h region, consists of 7-16 non-conserved amino acids and has been identified in 126 signal peptides ranging in length from 18-21 amino acids. Accordingly, a cell-penetrating polypeptide of the may include any one or combination of these or other known signal sequences.

MTDs comprising signal sequence-based peptides coupled to nuclear localization sequences (NLSs) may also be used as part of the cell-penetrating polypeptide. For example, the peptide signal sequence-based peptide I is a chimera of the hydrophobic terminal domain of the viral gp41 protein and the NLS from the 5V40 large antigen, and has been found to be active in membrane translocation. Additionally, the peptide signal sequence-based peptide II is derived from the nuclear localization signal of NF-κB p50 and USF2. Any one or combination of known membrane translocation sequences, including those provided herein may be used alone or in combination with the cell-penetrating polypeptide of the present invention to deliver the amino acid sequence substantially identical to the amino acid sequence of a TRAF binding domain into a cell.

The cell-penetrating polypeptide may also include transportan. Transportan is a fusion between the neuropeptide galanin and the wasp venom peptide mastoparan. It can be localized in both the cytoplasm and nucleus, and may comprise the amino acid sequence GWTLNSAGYLLKINL-KALAALAKKIL (SEQ ID NO: 7). The mechanism of cell penetration by transportan is not clear; however, it is known to be energy-independent and that receptors and endocytosis are not involved. Accordingly, the cell-penetrating polypeptide can comprise transportan, transportan homologues, and/or fragments thereof. For example, a cell-penetrating polypeptide comprising a transportan variant may include N-terminal deletions of about 1-6 amino acids as such deletions are known to increase translocational activity of transportan.

The MTD can also include an amphiphilic model peptide. Amphiphilic model peptide is a synthetic 18-mer, KLA-LKLALKALKAALKLA (SEQ ID NO: 8). The only essential structural requirement for amphiphilic model peptides is a length of four complete helical turns. The amphiphilic model peptide can cross the plasma membrane of various cell types, including mast and endothelial cells, for example, by both energy-dependent and energy-independent mechanisms. The translocation behavior of amphiphilic model peptide shows analogy to several membrane translocation domain sequences including, for example, Antp-HD and Tat. Accordingly, the MTD can comprise any amphiphilic model peptide, homolog, variant, and/or fragment thereof.

While any of the MTDs (including domains and/or sequences and/or fragments thereof exhibiting membrane translocation activity) provided above may be used for the purpose of generating a cell-penetrating polypeptide, it should be appreciated that other variations are also possible. For example, variations such as mutations (e.g., point mutations, deletions, insertions, etc.) of any of the sequences disclosed herein may be employed, provided that some membrane translocation activity is retained. Furthermore, it will be appreciated that retro-inverso peptides of the MTD can also be used.

The CD40-TRAF2,3 blocking peptide that inhibits binding of CD40 to TRAF2,3 can include a polypeptide comprising an amino acid sequence substantially identical or homologous to the amino acid sequence of the TRAF 2 binding domain (e.g., TRAF 2,3 binding site) or a retro-inverso amino acid sequence thereof.

In some embodiments, CD40-TRAF2,3 blocking peptides that are substantially identical to the TRAF2,3 binding domain and can competitively inhibit binding of native TRAF2 polypeptides to the TRAF2,3 binding domain of CD40 can have an about 5 to about 20 amino acid sequence that is substantially identical to about 5 to about 20 consecutive amino acids of the TRAF2,3 binding domain and includes an amino acid sequence of $X_1X_2QEX_3$ (SEQ ID NO: 9), or a retro-inverso amino acid sequence thereof, wherein X1 is P or H;
$X_2$ is V, I, or T;
$X_3$ is T or S;
$X_1$ is not P if $X_2$ is V and $X_3$ is T;
$X_2$ is not V if $X_1$ is P and $X_3$ is T; and
$X_3$ is not T, if $X_1$ is P and $X_2$ is V.

For example, the CD40-TRAF2,3 blocking peptide does not include the amino acid sequence of PVQET (SEQ ID NO: 10) or a retro-inverso amino acid sequence thereof.

Examples of CD40-TRAF2,3 blocking peptides that include SEQ ID NO: 9 and not SEQ ID NO: 10 can have the amino acid sequence of:

```
                            (SEQ ID NO: 11)
SNTAAHVQETLHG;

(SEQ ID NO: 12)
SNTAAHIQETLHG;

(SEQ ID NO: 13)
SNTAAHVQESLHG;

(SEQ ID NO: 14)
SNTAAHIQESLHG;

(SEQ ID NO: 15)
SNTAAPIQETLHG;

(SEQ ID NO: 16)
SNTAAPIQESLHG; or (SEQ ID NO: 17)
SNTAAPVQESLHG.
```

Still another example of a CD40-TRAF2,3 blocking peptide that includes SEQ ID NO: 9 and not SEQ ID NO: 10 can have the amino acid sequence NTAAHVQETLHG (SEQ ID NO: 18). SEQ ID NO: 18 includes a deletion of the serine residue of SEQ ID NO: 11 that mismatches human and mouse sequences.

Other examples of polypeptides that can include the amino acid sequence of SEQ ID NO: 9 and can competitively inhibit binding of native TRAF2 polypeptides to the TRAF2,3 binding domain of CD40 can have the following amino acid sequences:

```
                            (SEQ ID NO: 19)
DLPGSNTAAHVQET, (SEQ ID NO: 20)
NTAAHVQETLHGC, (SEQ ID NO: 21)
NTAAHVQETLHG, (SEQ ID NO: 22)
NTAAHVQETLH, (SEQ ID NO: 23)
NTAAHVQETL, or (SEQ ID NO: 24)
NTAAHVQET.
```

The CD40-TRAF2,3 blocking peptides can be subject to various changes, substitutions, insertions, and deletions where such changes provide for certain advantages in its use. In this regard, the CD40-TRAF2,3 blocking peptides that block TRAF2 binding to CD40 can be substantially homologous with, rather than be identical to, the sequence of a recited peptide where one or more changes are made and it retains the ability to function as specifically block TRAF2 binding to CD40.

The CD40-TRAF2,3 blocking peptides can be in any of a variety of forms of polypeptide derivatives, that include amides, conjugates with proteins, cyclized polypeptides, polymerized polypeptides, retro-inverso peptides, analogs, fragments, chemically modified polypeptides, and the like derivatives.

Retro-inverso peptides are linear peptides whose amino acid sequence is reversed and the α-center chirality of the amino acid subunits is inverted as well. These types of peptides are designed by including D-amino acids in the reverse sequence to help maintain side chain topology similar to that of the original L-amino acid peptide and make them more resistant to proteolytic degradation. D-amino acids represent conformational mirror images of natural L-amino acids occurring in natural proteins present in biological systems. Peptides that contain D-amino acids have advantages over peptides that just contain L-amino acids. In general, these types of peptides are less susceptible to proteolytic degradation and have a longer effective time when used as pharmaceuticals. Furthermore, the insertion of D-amino acids in selected sequence regions as sequence blocks containing only D-amino acids or in-between L-amino acids allows the design of peptide based drugs that are bioactive and possess increased bioavailability in addition to being resistant to proteolysis. Furthermore, if properly designed, retro-inverso peptides can have binding characteristics similar to L-peptides.

In some embodiments, retro-inverso CD40-TRAF2,3 blocking peptides (i.e., ri CD40-TRAF2,3 blocking peptides) that can competitively inhibit binding of native TRAF2 polypeptides to the TRAF2,3 binding domain of CD40 can have an amino acid sequence of $X_1EQX_2X_3$ (SEQ ID NO: 25);

wherein $X_1$ is T or S;
$X_2$ is V, I, or T;
$X_3$ is P or H;
$X_1$ is not T, if $X_3$ is P and $X_2$ is V;
$X_2$ is not V if $X_3$ is P and $X_1$ is T; and
$X_3$ is not P if $X_2$ is V and $X_1$ is T.

For example, the retro-inverso (ri) CD40-TRAF2,3 blocking peptide does not include the amino acid sequence of TEQVP (SEQ ID NO: 26)

Other examples of ri CD40-TRAF2,3 blocking peptides that can include the amino acid sequence of SEQ ID NO: 25 and not SEQ ID NO: 26 can have the amino acid sequence of:

```
                            (SEQ ID NO: 27)
GHLTEQVHAATNS;

(SEQ ID NO: 28)
GHLTEQIHAATNS;
```

GHLSEQVHAATNS; (SEQ ID NO: 29)

GHLSEQIHAATNS; (SEQ ID NO: 30)

GHLTEQIPAATNS; (SEQ ID NO: 31)

GHLSEQIPAATNS; or (SEQ ID NO: 32)

GHLSEQVPAATNS. (SEQ ID NO: 33)

Still another example of CD40-TRAF2,3 blocking peptide that includes SEQ ID NO: 25 and not SEQ ID NO: 26 can have the amino acid sequence GHLTEQVHAATN (SEQ ID NO: 34). SEQ ID NO: 34 includes a deletion of the serine residue of SEQ ID NO: 27 that mismatches human and mouse sequences.

The term "analog" includes any polypeptide having an amino acid residue sequence substantially identical to a sequence specifically shown herein in which one or more residues have been conservatively substituted with a functionally similar residue and that specifically block TRAF2 binding to CD40 as described herein. Examples of conservative substitutions include the substitution of one non-polar (hydrophobic) residue, such as isoleucine, valine, leucine or methionine for another, the substitution of one polar (hydrophilic) residue for another, such as between arginine and lysine, between glutamine and asparagine, between glycine and serine, the substitution of one basic residue such as lysine, arginine or histidine for another, or the substitution of one acidic residue, such as aspartic acid or glutamic acid for another.

The phrase "conservative substitution" also includes the use of a chemically derivatized residue in place of a non-derivatized residue provided that such peptide displays the requisite binding activity.

"Chemical derivative" refers to a subject polypeptide having one or more residues chemically derivatized by reaction of a functional side group. Such derivatized molecules include for example, those molecules in which free amino groups have been derivatized to form amine hydrochlorides, p-toluene sulfonyl groups, carbobenzoxy groups, t-butyloxycarbonyl groups, chloroacetyl groups or formyl groups. Free carboxyl groups may be derivatized to form salts, methyl and ethyl esters or other types of esters or hydrazides. Free hydroxyl groups may be derivatized to form O-acyl or O-alkyl derivatives. The imidazole nitrogen of histidine may be derivatized to form N-im-benzylhistidine. Also included as chemical derivatives are those polypeptides, which contain one or more naturally occurring amino acid derivatives of the twenty standard amino acids. For examples: 4-hydroxyproline may be substituted for proline; 5-hydroxylysine may be substituted for lysine; 3-methylhistidine may be substituted for histidine; homoserine may be substituted for serine; and ornithine may be substituted for lysine. Polypeptides described herein also include any polypeptide having one or more additions and/or deletions or residues relative to the sequence of a polypeptide whose sequence is shown herein, so long as the requisite activity is maintained.

The term "fragment" refers to any subject polypeptide having an amino acid sequence shorter than that of a polypeptide whose amino acid sequence is shown herein.

Any polypeptide or compound may also be used in the form of a pharmaceutically acceptable salt. Acids, which are capable of forming salts with the polypeptides, include inorganic acids such as trifluoroacetic acid (TFA) hydrochloric acid (HCl), hydrobromic acid, perchloric acid, nitric acid, thiocyanic acid, sulfuric acid, phosphoric acetic acid, propionic acid, glycolic acid, lactic acid, pyruvic acid, oxalic acid, malonic acid, succinic acid, maleic acid, fumaric acid, anthranilic acid, cinnamic acid, naphthalene sulfonic acid, sulfanilic acid or the like.

Bases capable of forming salts with the polypeptides include inorganic bases, such as sodium hydroxide, ammonium hydroxide, potassium hydroxide and the like; and organic bases such as mono-, di- and tri-alkyl and arylamines (e.g., triethylamine, diisopropylamine, methylamine, dimethylamine and the like) and optionally substituted ethanolamines (e.g., ethanolamine, diethanolamine and the like).

The CD40-TRAF2,3 blocking peptides can be synthesized by any of the techniques that are known to those skilled in the peptide art, including recombinant DNA techniques. Synthetic chemistry techniques, such as a solid-phase Merrifield-type synthesis, can be used for reasons of purity, antigenic specificity, freedom from undesired side products, case of production and the like. A summary of the many techniques available can be found in Steward et al., "Solid Phase Peptide Synthesis". W. H. Freeman Co., San Francisco, 1969; Bodanszky, et al., "Peptide Synthesis", John Wiley & Sons, Second Edition, 1976; J. Meienhofer, "Hormonal Proteins and Peptides", Vol. 2, p. 46, Academic Press (New York), 1983; Merrifield, Adv. Enzymol., 32:221-96, 1969; Fields et al., int. J. Peptide Protein Res., 35:161-214, 1990; and U.S. Pat. No. 4,244,946 for solid phase peptide synthesis, and Schroder et al., "The Peptides", Vol. 1, Academic Press (New York), 1965 for classical solution synthesis, each of which is incorporated herein by reference. Appropriate protective groups usable in such synthesis are described in the above texts and in J. F. W. McOmic, "Protective Groups in Organic Chemistry", Plenum Press, New York, 1973, which is incorporated herein by reference.

In general, the solid-phase synthesis methods contemplated comprise the sequential addition of one or more amino acid residues or suitably protected amino acid residues to a growing peptide chain. Normally, either the amino or carboxyl group of the first amino acid residue is protected by a suitable, selectively removable protecting group. A different, selectively removable protecting group is utilized for amino acids containing a reactive side group such as lysine.

Using a solid phase synthesis as an example, the protected or derivatized amino acid can be attached to an inert solid support through its unprotected carboxyl or amino group. The protecting group of the amino or carboxyl group can then be selectively removed and the next amino acid in the sequence having the complimentary (amino or carboxyl) group suitably protected is admixed and reacted under conditions suitable for forming the amide linkage with the residue already attached to the solid support. The protecting group of the amino or carboxyl group can then be removed from this newly added amino acid residue, and the next amino acid (suitably protected) is then added, and so forth. After all the desired amino acids have been linked in the proper sequence, any remaining terminal and side group protecting groups (and solid support) can be removed sequentially or concurrently, to afford the final linear polypeptide.

The cell-penetrating CD40-TRAF2,3 blocking peptide may be prepared using techniques known in the art. For example, a cell-penetrating polypeptide can be chemically synthesized by synthesizing a MTD and CD40-TRAF2,3 blocking peptide, and then fusing the respective polypeptides using known techniques (see, e.g., Mukundan, L. et al., J. Immunol. 174:1081-1090 (2005); Tsao, D. H. et al., Mol. Cell 5:1051-1057 (2000)).

One example of a cell-penetrating CD40-TRAF2,3 blocking peptide is SNTAAHVQETLHG YGRKKRRQRRR (SEQ ID NO: 35). Still another example of a cell-penetrating CD40-TRAF2,3 blocking peptide comprising a MTD and a CD40-TRAF2,3 blocking peptide is NTAAHVQETLHG YGRKKRRQRRR (SEQ ID NO: 36). Other examples of a cell-penetrating CD40-TRAF2,3 blocking peptide comprising a MTD and a CD40-TRAF2,3 blocking peptide are AAVALLPAVLLALLAP SNTAAHVQETLHG (SEQ ID NO: 37) or NTAAHVQETLHG YGRKKRRQRRR (SEQ ID NO: 38). Still other examples of ri cell-penetrating CD40-TRAF2,3 blocking peptide comprising a ri MTD and a ri CD40-TRAF2,3 blocking peptide are GHLTEQVHAATN PALLALLVAPLLAVAA (SEQ ID NO: 39) and RRRQRRKKRGY GHLTEQVHAATN (SEQ ID NO: 40).

It will be appreciated that the cell-penetrating CD40-TRAF2,3 blocking peptides can also be chemically cross-linked or coupled to larger peptides and proteins. The coupling may be permanent or transient, and may involve covalent or non-covalent interactions. Direct linkage, for example, may be achieved by localizing a functional group, such as a hydroxyl, carboxy, or amino group on the peptides. Indirect linkage can be achieved through a linking moiety, such as one or more of bi-functional cross-linking agents, for example. Coupling technologies are well known in the art.

Other methods for forming fusion proteins are known in the art and can include, for example, fusing a MTD to an amino acid sequence substantially homologous to the amino acid sequence of a TRAF binding domain using a suitable host, such as a eukaryotic or prokaryotic cell. The nucleic acid sequences may be in-frame and may be located downstream of an N-terminal leader sequence (e.g., a sequence comprising a 6-Histidine tag). The N-terminal leader sequence may enable purification of the expressed cell-penetrating polypeptide using methods known in the art.

Additionally or optionally, the cell-penetrating CD40-TRAF2,3 blocking peptide can include a linker sequence that operably couples the MTD with the amino acid sequence that is substantially homologous to a TRAF binding domain. Such a linker sequence may include a sequence of amino acids susceptible to cleavage by native enzymes (e.g., proteases), for example. The linker may comprise amino acid residues and/or hydrocarbon chains capable of connecting the MTD and the amino acid sequence that is substantially homologous to a TRAF binding domain, for example, via peptide bonds. Useful linkers can also include natural and unnatural biopolymers. A non-exclusive example of a natural linker includes L-oligopeptides, while examples of unnatural linkers include D-oligopeptides, lipid oligomers, liposaccharide oligomers, peptide nucleic acid oligomers, polylactate, polyethylene glycol, cyclodextrin, polymethacrylate, gelatin, and oligourea.

Additionally, the cell-penetrating CD40-TRAF2,3 blocking peptide can be modified by natural processes, such as posttranslational processing, and/or by chemical modification techniques, which are known in the art. Modifications may occur anywhere in the polypeptide including the polypeptide backbone, the amino acid side-chains and the amino or carboxy termini. It will be appreciated that the same type of modification may be present in the same or varying degrees at several sites in a given polypeptide. The polypeptides may be branched as a result of ubiquitination, and they may be cyclic, with or without branching. Cyclic, branched and branched cyclic polypeptides may result from posttranslational natural processes or may be made by synthetic methods. Modifications comprise for example, without limitation, acetylation, acylation, addition of acetomidomethyl (Acm) group, ADP-ribosylation, amidation, covalent attachment to flavin, covalent attachment to a heme moiety, covalent attachment of a nucleotide or nucleotide derivative, covalent attachment of a lipid or lipid derivative, covalent attachment of phosphatidylinositol, cross-linking, cyclization, disulfide bond formation, demethylation, formation of covalent cross-links, formation of cystine, formation of pyroglutamate, formylation, gamma-carboxylation, glycosylation, GPI anchor formation, hydroxylation, iodination, methylation, myristoylation, oxidation, proteolytic processing, phosphorylation, prenylation, racemization, selenoylation, sulfation, transfer-RNA mediated addition of amino acids to proteins such as arginylation and ubiquitination (for reference see, Protein-structure and molecular properties, $2^{nd}$ Ed., T. E. Creighton, W. H. Freeman and Company, New-York, 1993).

Other type of polypeptide modification may include for example, amino acid insertion (i.e., addition), deletion and substitution (i.e., replacement), either conservative or non-conservative (e.g., D-amino acids) in the polypeptide sequence where such changes do not substantially alter the overall bioactivity of the polypeptide.

Various delivery systems can be used to administer the cell-penetrating CD40-TRAF2.3 blocking peptide to a cell of the subject to inhibit TRAF 2 binding to CD40. Examples of such delivery systems can include, but are not limited to, encapsulation in liposomes, microparticles, microcapsules, recombinant cells capable of expressing the agent, receptor-mediated endocytosis, construction of a nucleic acid as part of a retroviral or other vector, commercially available products (e.g., the CHARIOT protein delivery system), and the like. Methods of introduction into the subject can include, but are not limited to, intradermal, intramuscular, intraperitoneal, intravenous, subcutaneous, intranasal, epidural, and oral routes. The cell-penetrating CD40-TRAF2.3 blocking peptide may be administered by any convenient route, for example, by infusion or bolus injection, by absorption through epithelial, or by absorption through mucocutaneous linings (e.g., oral mucosa, rectal and intestinal mucosa, etc.). Administration can be systemic or local by, for example, topical, local, and systemic delivery methods, such as ophthalmic, parenteral, subcutaneous, intravenous, intraarticular, intrathecal, intramuscular, intraperitoneal, intradermal injections, or by intravitreal injection, intraocular injection or periocular injection. The particular approach and dosage used for a particular subject depends on several factors including, for example, the general health, weight, and age of the subject. Based on factors such as these, a medical practitioner can select an appropriate approach to treatment.

In a further aspect, the cell-penetrating CD40-TRAF2,3 blocking peptide can include a physiologically acceptable diluent or a pharmaceutically acceptable carrier, such as sterile water or sterile isotonic saline. As used herein, the term "pharmaceutically acceptable carrier" refers to any and all solvents, dispersion media, coatings, antibacterial and antifungal agents, isotonic and absorption delaying agents, and the like, compatible with administration of the formulation to a subject. The appropriate carrier will be evident to those skilled in the art and will depend in part upon the route of administration.

Additional components that may be present with the formulation can include adjuvants, preservatives, chemical stabilizers, and/or other proteins. Typically, stabilizers, adjuvants, and preservatives are optimized to determine the best formulation for efficacy in a subject. Examples of preservatives can include, but are not limited to, chlorobutanol, potassium sorbate, sorbic acid, sulfur dioxide, propyl gallate, the parabens, ethyl vanillin, glycerin, phenol, and parachlorophenol. Stabilizing ingredients can include, for example, casamino acids, sucrose, gelatin, phenol red, N-Z amine, monopotassium diphosphate, lactose, lactalbumin hydrolysate, and dried milk.

Other components of the formulation can include, for example, surface active substances (e.g., hexadecylamine, octadecylarnine, octadecyl amino acid esters, lysolecithin, dimethyl-dioctadecylammonium bromide), methoxyhexadecyiglycerol, pluronic polyols, polyamines (e.g., pyran, dextransulfate, poly IC, carbopol), oil emulsions, mineral gels (e.g., aluminum phosphate), liposomes, polysaccharides, lipopolysaccharides, and/or other polymers.

The cell-penetrating CD40-TRAF2,3 blocking peptide can be delivered to a cell expressing CD40 at amount effective to inhibit activation of the cell by CD154. Administering an effective amount of the cell-penetrating CD40-TRAF2,3 blocking peptide to a CD40-expressing cell can inhibit activation of the cell by CD154 by blocking the interaction (i.e., binding) of native TRAF polypeptides with their respective TRAF binding domains. Preventing or blocking the interaction of native TRAF polypeptides with their respective TRAF binding domains can in turn disrupt the CD40-signaling pathway and reduce or inhibit the expression of inflammatory molecules.

In an example of the method, a therapeutically effective amount of a cell-penetrating CD40-TRAF2,3 blocking peptide can be administered to subject suffering from atherosclerosis. The cell-penetrating CD40-TRAF2,3 blocking peptide can be prepared using a known method, such as synthetic peptide synthesis. The cell-penetrating CD40-TRAF2,3 blocking peptide can then be administered to the subject via local or systemic injection. For example, the cell-penetrating CD40-TRAF2,3 blocking peptide can be injected into a coronary artery having an atherosclerotic lesion.

Upon injection into the coronary artery, the MTD of the cell-penetrating CD40-TRAF2,3 blocking peptide can contact the cell membrane of an endothelial cell, which lines a portion of the arterial surface. The cell-penetrating CD40-TRAF2,3 blocking peptide can then be translocated across the plasma membrane of the endothelial cell via an energy- and receptor-independent mechanism. Entry of the cell-penetrating CD40-TRAF2,3 blocking peptide into the cytoplasm of the endothelial cell allows the portion of the cell-penetrating CD40-TRAF2,3 blocking peptide comprising an amino acid sequence substantially identical with TRAF 2,3 binding site to inhibit binding of TRAF2 to the TRAF2,3 binding domain. Inhibition of TRAF 2 binding to TRAF 2,3 binding domain can decrease or inhibit the CD40-singaling pathway in the endothelial cell and thereby decrease or inhibit the activity or expression of pro-inflammatory molecules, such as VCAM-1, ICAM-1, MCP-1, RANTES, IL-8, metalloproteinases, tissue factor, NOS2, COX-2, and VEGF. Decreasing or inhibiting the activity or expression of such pro-inflammatory molecules can decrease or inhibit the pro-atherogenic response in the subject.

Other embodiments described herein relate to a method of treating a CD40-mediated disease in a subject by administering to a cell expressing CD40 a cell-penetrating CD40-TRAF2,3 blocking peptide that inhibits the binding of a native TRAF 2 polypeptide to a TRAF 2,3 binding domain and a cell-penetrating CD40-TRAF6 blocking peptide.

The cell-penetrating CD40-TRAF6 blocking peptide that inhibits binding of native TRAF 6 polypeptide to a cytoplasmic part of CD40. TRAF 6 binding to the TRAF6 binding site of CD40 can control IL-1 and other pro-inflammatory cytokine production by macrophages. Inhibition of the TRAF 6 binding the TRAF 6 binding site can therefore inhibit IL-1 production and/or IL-1 activity.

The cell-penetrating CD40-TRAF6 blocking peptide can be a cell penetrating polypeptide that includes a MTD polypeptide and a polypeptide comprising an amino acid sequence substantially identical to the amino acid sequence of a TRAF 6 binding domain. The MTD can include any one or combination of the MTDs described above, so long as the MTD has the ability to cross a plasma membrane into a cell interior in an energy- and receptor-independent manner (i.e., via endocytosis). In an example, the MTD of cell-penetrating CD40-TRAF6 blocking peptide can include K-FGF. It should be appreciated however, that MTDs which cross the plasma membrane in ways other than endocytosis are also included within the scope of the present invention.

The CD40-TRAF6 blocking peptide that is substantially identical to the amino acid sequence of a TRAF 6 binding domain can be RRQDAQEMED (SEQ ID NO: 41) or a retro-inverso amino acid sequence thereof DEMEQADQRR (SEQ ID NO: 42). It will be appreciated that sequence variations of SEQ ID NO: 41 are possible, provided that the polypeptide can still competitively inhibit binding of native TRAF6 polypeptides to the TRAF6 binding domain of CD40. It will be appreciated that the CD40-TRAF6 blocking peptide can include other variations as long as these other variations inhibit binding of TRAF 6 polypeptides to TRAF 6 binding domain of CD40.

As described above, the cell-penetrating polypeptide may be prepared using techniques known in the art. For example, the cell-penetrating polypeptide can be synthesized by fusing a MTD and an amino acid sequence substantially homologous to the TRAF 6 binding domain.

One example of a cell-penetrating CD40-TRAF6 blocking peptide synthesized from a MTD and a polypeptide substantially identical to TRAF 6 binding domain is RRQDAQEMED YGRKKRRQRRR (SEQ ID NO: 43). Another example of a ri cell-penetrating CD40-TRAF6 blocking peptide comprising a ri MTD and a ri polypeptide substantially identical to TRAF 6 binding domain is RRRQRRKKRGY DEMEQADQRR (SEQ ID NO: 44).

Alternatively, a monoclonal or polyclonal antibody capable of inhibiting or decreasing the activity of IL-1 can be used in combination with the cell-penetrating CD40-TRAF2,3 blocking peptide or cell-penetrating CD40-TRAF6 blocking peptide. For example, the monoclonal or polyclonal antibody directed against IL-la or IL-1B or agents that block the function of IL-1 receptors. Examples of anti-IL-1 antibodies are well known in the art and can include those disclosed in PCT Pub. No. WO/9501997, PCT Pub. No. WO/9402627, PCT Pub. No. WO/9006371, U.S. Pat. No. 4,935,343, European Patent No. EP 364778, European Patent No EP 267611, and European Patent No EP 220063.

Administration of the cell-penetrating CD40-TRAF2,3 blocking peptide and optionally the cell-penetrating CD40-TRAF6 blocking peptide to the cell expressing CD40 can have a multi-factorial effect on the pro-inflammatory response of the subject. As described above administering an effective amount of the cell-penetrating CD40-TRAF2,3 blocking peptide to a CD40-expressing cell can inhibit activation of the cell by CD154 by blocking the interaction (i.e., binding) of native TRAF polypeptides with their respective TRAF binding domains. Preventing or blocking the interaction of native TRAF polypeptides with their respective TRAF binding domains can in turn disrupt the CD40-signaling pathway and reduce or inhibit the expression of inflammatory molecules.

Delivering the cell-penetrating CD40-TRAF6 blocking peptide to a cell can also affect the pro-inflammatory response by directly reducing the production and hence activity of IL-1 (e.g., TRAF 6 inhibitor) or inhibiting the activity of IL-1 (IL-1 antibody). By blocking the activity of IL-1, the inflammatory response mediated by IL-1 and TNF-α can thus be decreased or inhibited. Additionally, it is known that blockade of IL-1 does not appear to cause significant susceptibility to opportunistic infections, and CD40-induced dendritic cell activation and macrophage anti-microbial activity are independent of IL-1 activity. Thus, simultaneous blockade of the TRAF2,3 binding domain plus inhibition of IL-1 activity may leave cell-mediated immunity largely unimpaired.

The following example is for the purpose of illustration only, and are not intended to limit the scope of the claims, which are appended hereto.

Example

CD40 is expressed in retinal cells: endothelial cells, Müller cells, microglia, ganglion cells and retinal pigment epithelial cells. Given that CD40 is a key driver of retinal inflammation and development of ischemic retinopathies, we examined the effects of pharmacologic inhibition of CD40-TRAF2,3 signaling in the development of inflammation and retinopathy after retinal ischemia. Cell-penetrating peptides impair protein-protein interactions. We showed that a cell permeable peptide that consists of the amino acid sequence of the TRAF2,3 site fused with HIV TAT47-57 to make it cell permeable inhibits CD40-driven inflammatory responses in vitro. The peptide impairs the CD40-TRAF2,3 pathway both in human and mouse cells since the amino acid sequence of the TRAF2,3 binding site is the same in both species. Retro inverso (ri) peptides made following reverse amino acid sequence and synthesized with D-amino acids can have identical function to those made with L-amino acids and are resistant to peptidases. We show herein that a ri CD40-TRAF2,3 blocking peptide markedly impairs inflammation and cell loss in the ganglion cell layer after retinal I/R even if administered after retinal ischemia. In contrast to a CD40-TRAF6 blocking peptide, the CD40-TRAF2,3 blocking peptide did not increase susceptibility to retinitis caused by *Toxoplasma gondii*, an opportunistic pathogen normally controlled by CD40. These studies provide the first evidence that pharmacologic inhibition of the CD40-TRAF2,3 pathway effectively controls a CD40-driven inflammatory disorder without increasing susceptibility to an opportunistic pathogen.

Materials and Methods

Animals

C57BL/6 (B6) and Cd40−/− mice (B6 background) were purchased from Jackson Laboratories (Bar Harbor, ME) and bred at Case Western Reserve University. Studies were approved by the Institutional Animal Care and Use Committee of Case Western Reserve University School of Medicine.

Model of Retinal I/R

Retinal ischemia was induced in male mice (25 to 30 g) as described. The anterior chamber of one eye was cannulated with a 30-gauge needle. Intra-ocular pressure (IOP) was maintained at 80 to 90 mm Hg for 90 minutes. The other eye of the same animal was set up as a control. After ischemia, the needle was withdrawn, IOP was normalized, and reflow of the retinal circulation was documented visually. Animals were euthanized 2 days after I/R.

*Toxoplasma gondii* Infection

Female B6 mice (8 to 10 weeks old) were infected with 10 tissue cysts of the ME49 strain of *T. gondii*. Mouse retinal endothelial cells were challenged with tachyzoites of the RH strain of the parasite and the number of vacuoles and tachyzoites per 100 cells were determined by light microscopy.

Cell-Penetrating Peptides

Peptide consisted of the TRAF2,3 binding site of CD40 that was made cell permeable by linking it to the $TAT_{47-57}$ cell penetrating peptide. Peptides were synthesized using D-amino acids following reverse amino acid sequence (ri format). The sequence for the CD40-TRAF2,3 blocking peptide was $NH_2$-rrrqrrkkrgy ghlteqvhaatn-OH (SEQ ID NO: 40). The TAT47-57 sequence is underlined. The peptide contains a proline (p) to histidine (h) substitution (shown in italics) that appears to enhance affinity to TRAF2. The scrambled peptide $NH_2$-rrrqrrkkrgy ntqalahtgevh-OH (SEQ ID NO: 45) was used as control. The CD40-TRAF2,3 blocking peptide was also synthesized with Alexa Fluor 488 conjugated via maleimide coupling to an additional Cys in the N terminus. The sequence for the CD40-TRAF6 blocking peptide was $NH_2$-rrrqrrkkrgy demeqadqrr-OH (SEQ ID NO: 44). The proline to alanine (a) substitution (italics) maintains strong interaction with TRAF6. ri $TAT_{47-57}$ cell penetrating peptide was used as control in experiments that compared CD40-TRAF2,3 and CD40-TRAF6 blocking peptides. Peptides were manufactured by Biopeptide Co. (San Diego, CA) and were low in endotoxin and >98% pure by HPLC. Peptides were not toxic to Müller and endothelial cells as assessed by alamarBlue cell viability assay (Invitrogen, Carlsbad, CA). Peptides were used at 1 µM in vitro experiments (10 µM in the case of Alexa Fluor 488-conjugated peptide for optimal visualization of fluorescence) or a single dose of 1 µg for intravitreal injections studies. In certain experiments, peptides were injected i.p. (10 µg/kg) 3 h prior to i.p. administration of a stimulatory anti-CD40 mAb (1C10; 100 µg).

Histopathology

Histological changes induced by I/R were assessed. Formalin-fixed, paraffin embedded sections were stained with H&E for light microscopy. Cells in the ganglion cell layer (GCL) that were not associated with vessels were counted under 400×. Cells in the GCL positive for β-III tubulin (ganglion cell marker) and cells in the inner retina and vitreous positive for myeloperoxidase (MPO; highly expressed in PMNs while cells of monocytic origin are either nonreactive of weakly positive) were counted in retinal sections. Histopathologic evaluation of mice with ocular toxoplasmosis was performed as described.

Immunohistochemistry

Sections were incubated with antibodies against ICAM-1 (eBiosciences, San Diego, CA), CXCL1 (Novus, Littleton, CO), NOS2 (EMD Millipore, Burlington, MA), vimentin (Novus), CRALBP (Proteintech Group, Rosemont, IL), β-III tubulin (BioLegend) or MPO (Agilent, Santa Clara, CA) followed by incubation with fluorescent secondary antibodies (Jackson ImmunoResearch Laboratories, Inc., West Grove, PA). Sections were also incubated with Tomato lectin (Vector Laboratories, Burlingame, CA) or ApopTag Red, In situ Apoptosis Detection kit (EMD Millipore, Billerica, MA, USA). Frozen sections were used when examining expression of Alexa Fluor 488-conjugated peptide. Retinas were analyzed using Olympus FV1200 IX-83 confocal microscope. Images were processed in Photoshop CC 19.1.1. using similar linear adjustments for all samples.

Real Time Quantitative PCR

RNA was isolated using the RNeasy kit (Qiagen). After treating RNA with DNase (Ambion, Austin, TX), cDNA was generated using oligo $(dT)_{12-18}$ primers and Superscript III reverse transcriptase (Invitrogen). RT-PCR was performed using SYBR GREEN PCR Master Mix (Applied Biosystems, Foster City, CA) and primers. Gene expression was assessed using a 7300 Real Time PCR System (Applied Biosystems). Each cDNA sample was run in triplicate. Samples were normalized according to the content of 18S rRNA.

Retinal Cells and CD40 Stimulation

Primary human retinal endothelial cells were obtained as described and cultured in complete medium supplemented with endothelial cell growth supplement from bovine pituitary (15 µg/ml; Sigma Chemical, St Louis, MO) and insulin/transferrin/selenium (Sigma Chemical). Cell identity was confirmed by incorporation of acetylated low-density lipoprotein (>90%). Endothelial cells were used between passages 3 to 6. The human Müller cell line MIO M1 (gift from Dr. Gloria Limb; University College London, UK; >95% vimentin$^+$, CRALBP$^+$ and GFAP$^-$) was also used. Human cells were incubated with multimeric human CD154 to induce CD40 stimulation (1:10 dilution; obtained from Dr. Richard Kornbluth, Multimeric Biotherapeutics Inc., La Jolla, CA), a non-functional CD154 mutant (T147N) or TNF-α (Peprotech, Rocky Hill, NJ). Mouse retinal endothelial cells (mREC) were incubated with a stimulatory anti-mouse CD40 mAb (1C10; 10 µg/ml).

Luciferase Assay

Peptides were tested as described using the mouse endothelial cells mHEVc that expresses a chimera of the extracellular domain of human CD40 and intracytoplasmic domain of mouse CD40 (hmCD40) with either a mutation that prevents recruitment of TRAF2,3 (hmCD40 ΔT2,3) or TRAF6 (hmCD40 ΔT6). These cells were transfected with pGL4.32luc2P/NF-κB-RE/Hygro vector (Promega, Madison, WI) encoding an NF-KB response element that drives the luciferase reporter gene luc2P (Photinus pyralis). Cells were pre-incubated with peptides for 3 hr. followed by stimulation with human CD154. Luciferase activity was assessed using a Steady-Glo luciferase assay system (Promega) and a luminometer.

Flow Cytometry

Endothelial cells or splenocytes were incubated with conjugated mAbs (Table S2). After fixation with 1% paraformaldehyde, cells were analyzed using an LSR II (Becton Dickinson).

ELISA

Serum concentrations of IL-12 p70 were measured by ELISA (BioLegend, San Diego, CA). Anti-*T. gondii* IgG was detected in sera by ELISA and the antibody titer was calculated as described.

Statistical Analysis

D'Agostino & Pearson omnibus test was used to confirm normal distribution of the data. Data were analyzed by 2-tailed Student's t test or ANOVA. Differences were considered statistically significant at P<0.05.

Results

Figure 1A:
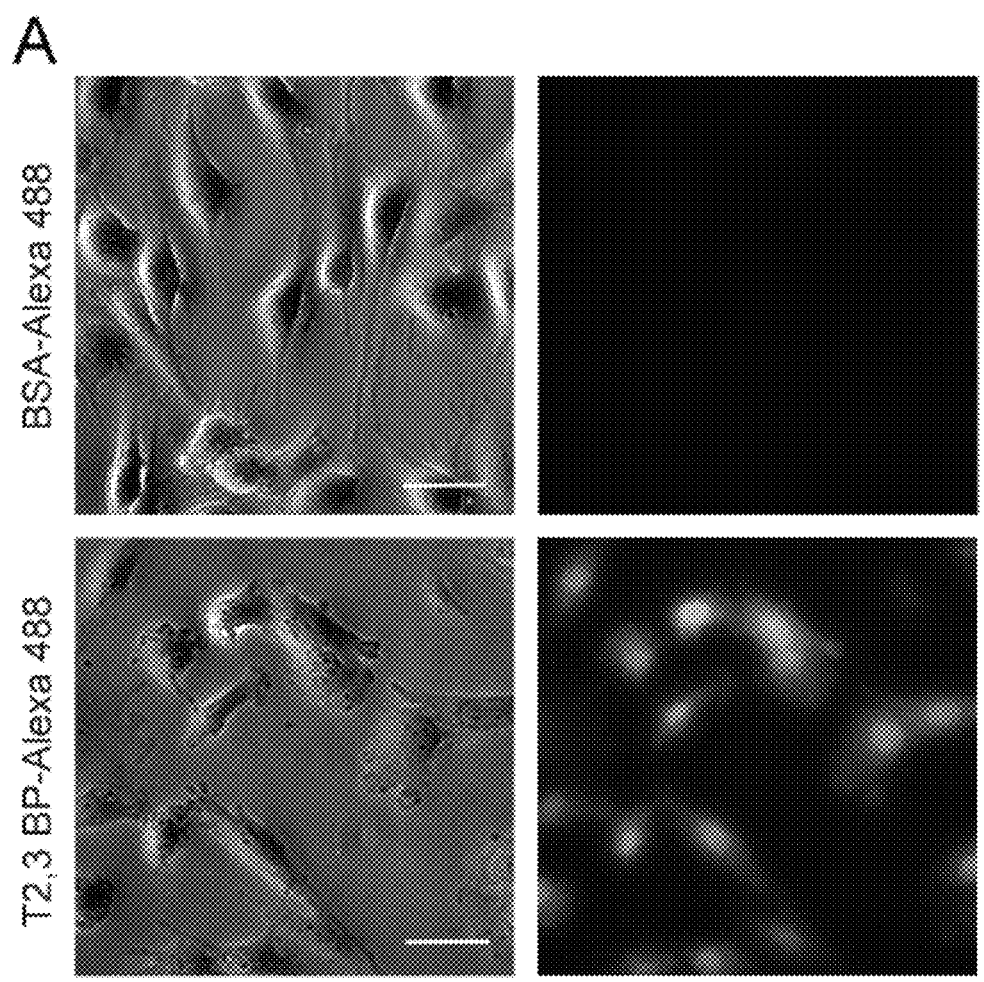
FIG. 1(A-D) illustrate images and plots showing retro-inverso (ri) CD40-TRAF2,3 blocking peptide penetrates cells, inhibits CD40-TRAF2,3 signaling and impairs CD40-driven ICAM-1 upregulation. A, Human Müller cells were incubated in medium containing Alexa Fluor 488-conjugated ri CD40-TRAF2,3 blocking peptide (T2,3 BP) or Alexa Fluor 488-conjugated bovine serum albumin (BSA; both at 10 µM) for 3 h. Scale bar, 50 µm. Original magnification X400. Images represent fluorescence of unfixed Müller cells after extensive washing of monolayers. B, Mouse endothelial cells (mHEVc) that express an NF-κB response element that drives transcription of a luciferase reporter plus either hmCD40 ΔT2,3 or hmCD40 ΔT6 were pre-incubated with ri control peptide (Ctr P) or ri CD40-TRAF2,3 blocking peptide (T2,3 BP; both at 1 µM) or medium alone followed by stimulation with human CD154. Data are expressed as fold-increase in normalized luciferase activity in cells stimulated with CD154 compared to cells treated with respective peptide in the absence of CD154. C, Human retinal endothelial cells were treated with ri control peptide (Ctr P) or ri CD40-TRAF2.3 blocking peptide (T2,3 BP; both at 1 µM) followed by stimulation with CD154 or TNF-α (100 pg/ml) for 24 h. Expression of ICAM-1 was assessed by flow cytometry. Dot plot and histogram show gating strategy. ICAM-1 was analyzed on live cells that did not stain with Aqua LIVE/DEAD kit. D, Human retinal endothelial cells were incubated with or without TNF-α (30 pg/ml) followed by treatment with peptides and stimulation with CD154. Data shown represent mean±SD of triplicate samples. Results are representative of 3 independent experiments. ** $P<0.01$ by ANOVA.
Figure 1B:
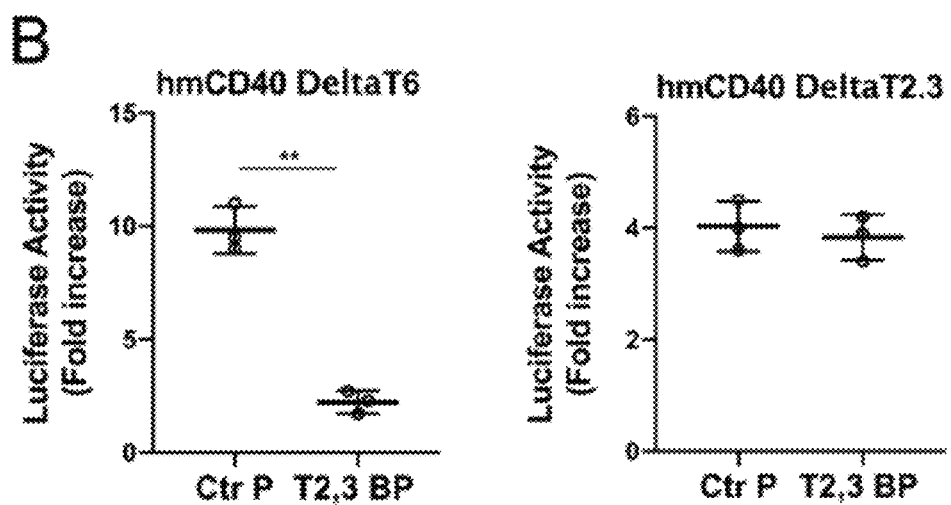

Retro-inverso (ri) CD40-TRAF2,3 blocking peptide inhibits CD40-TRAF2,3 but not CD40-TRAF6 signaling and inhibits CD40-induced pro-inflammatory responses A ri version of the previously described $TAT_{47-57}$-based CD40-TRAF2,3 blocking peptide was generated. ri CD40-TRAF2,3 blocking peptide tagged with Alexa Fluor 488 was used to determine whether it translocates inside cells. Using human Müller cells (the principal glia in the retina) as a model, immunofluorescence studies revealed intracellular incorporation of the fluorescent peptide after its addition to the culture medium (FIG. 1A). Next, we examined whether the ri CD40-TRAF2,3 blocking peptide inhibited CD40-TRAF2,3 signaling. We used reporter cell lines that consisted of mouse endothelial cells expressing a human-mouse CD40 chimera (extracellular human CD40 and intracellular mouse CD40) that signal either through the TRAF2,3 binding site (hmCD40 ΔT6) or the TRAF6 binding site (hmCD40 ΔT2,3). These cells express an NF-κB response element that drives a luciferase reporter gene. The blocking peptide inhibited CD154-induced NF-KB activity only in cells that expressed CD40 that signals through the TRAF2,3 binding site (FIG. 1B). In addition, the blocking peptide impaired CD154-induced activation of JNK, an event largely dependent on CD40-TRAF2 signaling (FIG. 8). Thus, ri CD40-TRAF2,3 blocking peptide selectively impairs CD40-TRAF2,3 signaling.

Figure 1C:
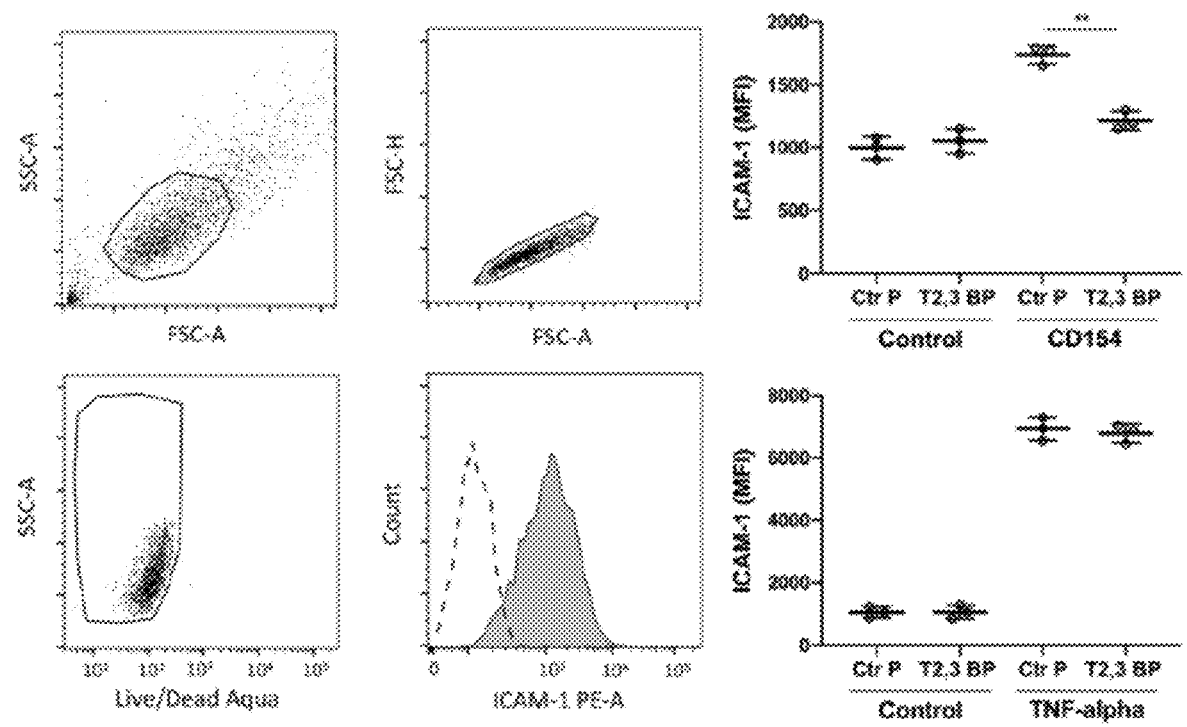
Figure 1D:
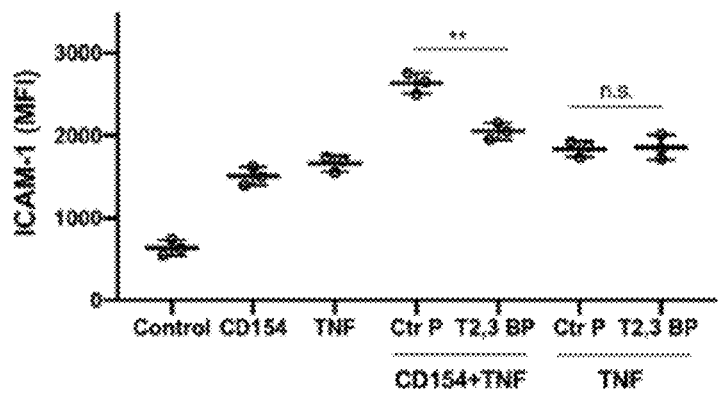

Human retinal endothelial cells were incubated with control or blocking peptides followed by stimulation with CD154. ri CD40-TRAF2,3 blocking peptide impaired upregulation of ICAM-1 in response to CD154 (FIG. 1C). The blocking peptide also impaired CD154-induced upregulation of ICAM-1 in endothelial cells previously exposed to TNF-α indicating that inhibition of CD40-TRAF2.3 signaling impairs pro-inflammatory responses even in the presence of a co-existing inflammatory milieu (FIG. 1D). In addition, ri CD40-TRAF2,3 blocking peptide impaired CCL2 secretion induced by CD154 (FIG. 9). Taken together, ri CD40-TRAF2,3 blocking peptide inhibits CD40-induced pro-inflammatory responses.

Figure 2A:
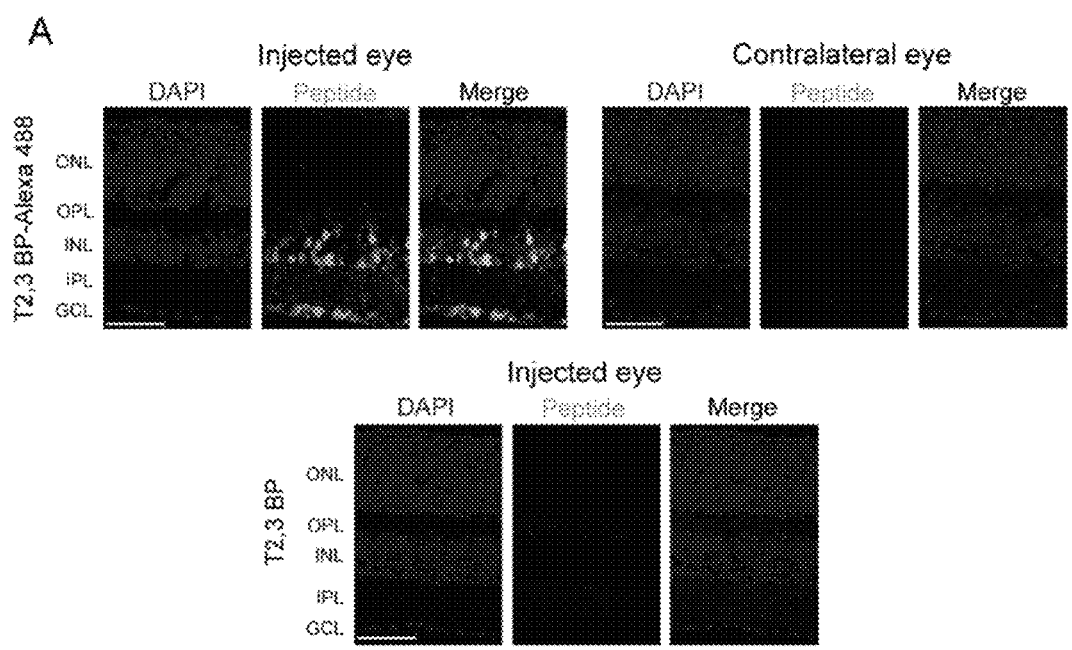
FIG. 2(A-C) illustrate images showing ri CD40-TRAF2.3 blocking peptide penetrates retinal cells. A, B6 mice received Alexa Fluor 488-conjugated ri CD40-TRAF2,3 blocking peptide or non-fluorescent ri CD40-TRAF2,3 blocking peptide (both 1 µg) via intravitreal injection of one eye. Injected and contralateral eyes were collected after 48 h and frozen sections were examined. GCL=Ganglion cell layer; IPL=Inner plexiform layer; INL=Inner nuclear layer. OPL=Outer plexiform layer; ONL=Outer nuclear layer. Scale bar, 50 µm. B, C, Retinas from mice injected with Alexa Fluor 488-conjugated ri CD40-TRAF2,3 blocking peptide were stained with DyLight 594 tomato lectin (labels neural endothelial cells, B) or with anti-CRALBP antibody (labels Müller cells, C). Green fluorescence was detected in cytoplasmic processes that co-stain with CRALBP (arrowheads). Scale bar 10 µm. Original magnification X600 for panel B and x400 for panel C. Results are representative of 3 independent experiments.
Figure 2B:
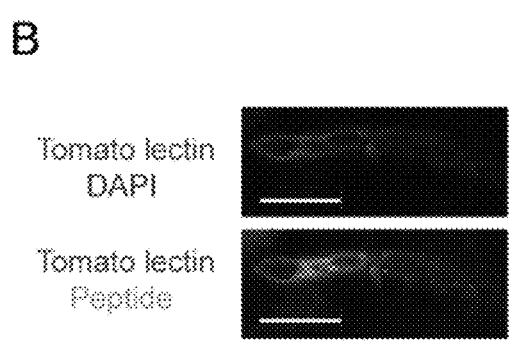
Figure 2C:
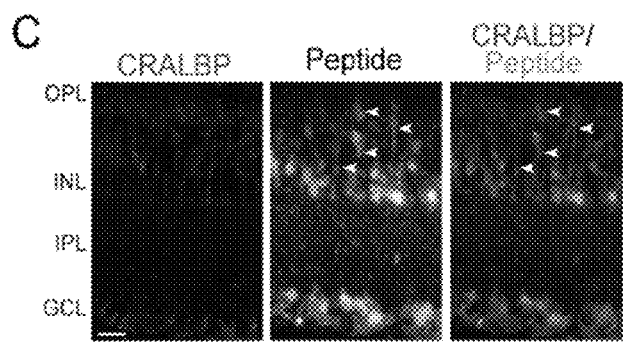

Intravitreal Administration of Ri CD40-TRAF2,3 Blocking Peptide Prior to I/R Protects Against Cell Loss in the Ganglion Cell Layer (GCL) and Leukocyte Infiltration in a Manner Similar to that Observed in Cd40$^{-/-}$ Mice To begin to test the in vivo effect of ri CD40-TRAF2,3 blocking peptide, we examined whether it translocates into retinal cells. Alexa Fluor 488-conjugated ri CD40-TRAF2,3 blocking peptide or non-fluorescent peptide were injected intravitreally and eyes were collected after 2 days. FIG. 2A shows uptake of fluorescent peptide that tended to localize in the inner retina, especially in nuclei located in this region. This is consistent with the pattern of nuclear accumulation reported for TAT. As described for other TAT-based cell penetrating peptides, the ri CD40-TRAF2,3 blocking peptide did not cause retinal pathology in the injected eye and was not detected in the contralateral eye (FIG. 2A). Nuclei that accumulated the peptide included those localized within tomato lectin$^+$ cells (endothelial cells; FIG. 2B). In vitro studies revealed that while the peptide accumulated in nuclei, it was also present in the cytoplasm (FIG. 1A). Indeed, the peptide was also detected in retinal cytoplasmic processes that co-expressed CRALBP indicating that Müller cells were also among those that exhibited peptide accumulation (FIG. 2C).

Figure 3A:
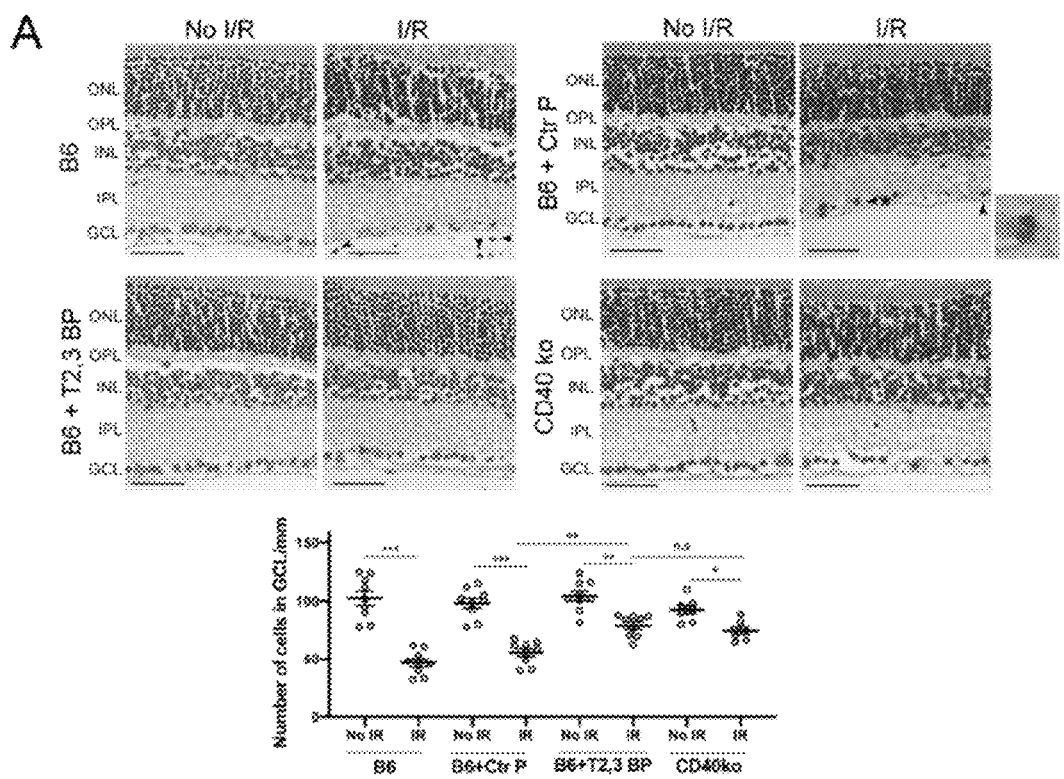
FIG. 3(A-C) illustrate images and plots showing ri CD40-TRAF2.3 blocking peptide protects against cell loss in the GCL and infiltration by MPO$^+$ leukocytes in retinas subjected to I/R. One eye from each B6 and Cd40$^{-/-}$ mouse was subjected to I/R. Contralateral non-ischemic eye was used as control. Eyes subjected to I/R in B6 mice were treated intravitreously with or without ri control peptide (Ctr P), ri CD40-TRAF2,3 blocking peptide (T2.3 BP; both 1 µg) 1 hr. prior to increase in IOP. Eyes were collected 2 d after I/R. A, Cell loss in the GCL is observed in ischemic eyes from B6 mice treated with ri control peptide or vehicle (original magnification X400). H&E; Scale bar, 50 µm. Eyes from these mice also exhibited PMN infiltration in the inner retina and vitreous (arrowhead). Arrowhead plus asterix identifies a PMN magnified in the inset (original magnification X600). The graph shows the numbers of cells in the GCL per mm. Horizontal bars represent mean±SEM (9 mice per group). B, Sections were stained with anti-β-III tubulin antibody. Arrowheads identify β-III tubulin$^+$ cells. Original magnification X400. Scale bar, 20 µm. The graph shows the numbers of β-III tubulin$^+$ cells in the GCL per mm. C, Sections were stained with anti-MPO antibody. MPO$^+$ cells (arrowheads) are magnified in the insets. Number of infiltrating MPO$^+$ leukocytes in the inner retina and vitreous per section. No MPO$^+$ cells were detected in the absence of I/R. GCL=Ganglion cell layer; IPL=Inner plexiform layer; INL=Inner nuclear layer; OPL=Outer plexiform layer; ONL=Outer nuclear layer. * $P<0.05$;  $P<0.01$; * $P<0.001$ by ANOVA.
Figure 3B:
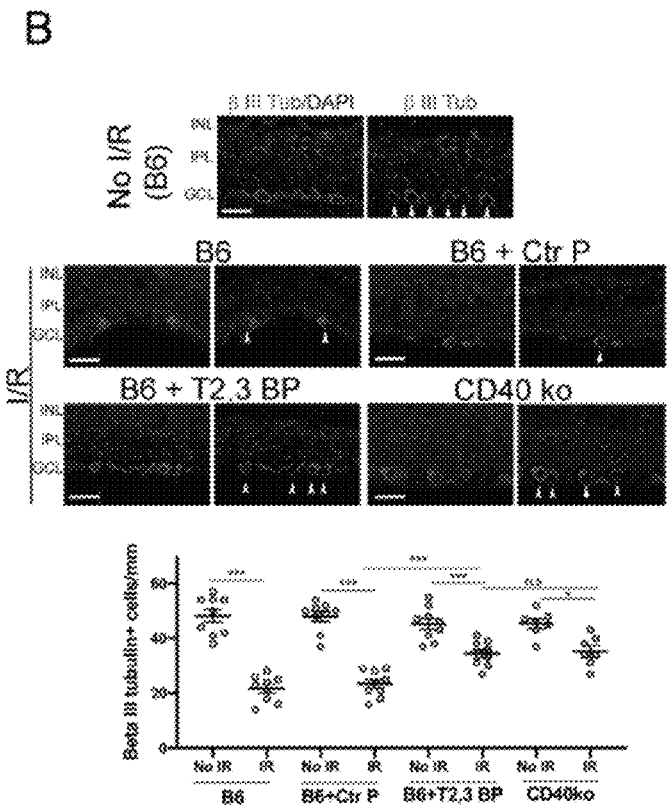
Figure 3C:
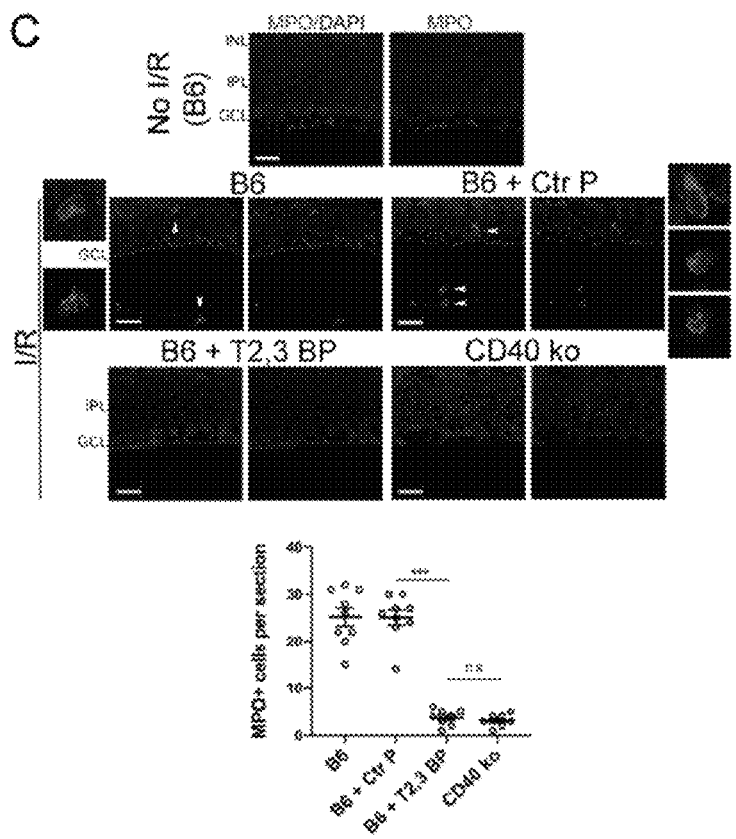

Next, we examined the in vivo effects of the ri CD40-TRAF2,3 blocking peptide using a model of I/R-induced retinal injury based on transient elevation of IOP. I/R of the retina causes cell loss in the GCL. Compared to contralateral non-ischemic eyes in B6 mice, eyes subjected to I/R developed cell loss in the GCL (FIG. 3A). There was a significant attenuation in cell loss in the GCL in eyes from B6 mice that received an intravitreal injection of ri CD40-TRAF2,3 blocking peptide 1 h prior to retinal ischemia (FIG. 3A). The effect of the blocking peptide was similar to that conferred by the lack of CD40 (Cd40$^{-/-}$ mice) (FIG. 3A). Neurons in the GCL include ganglion cells and displaced amacrine cells. Quantification of cells that express β-III tubulin, a ganglion cell marker, confirmed the protective effects of the ri CD40-TRAF2,3 blocking peptide on that cell type (FIG. 3B). In addition, administration of the ri CD40-TRAF2,3 blocking peptide also reduced the numbers of cells in the GCL that underwent programmed cell death as assessed by Tunel staining (FIG. 10).

Leukocytes including polymorphonuclear leukocytes (PMNs) infiltrate the retina since the early stages after I/R, a response important to the pathogenesis of neuronal loss after retinal I/R. Eyes from B6 mice treated with the control peptide developed infiltration in the inner retina and vitreous by leukocytes positive for MPO (strongly expressed in PMNs) (FIG. 3A, C). In contrast, ischemic eyes from B6 mice treated with ri CD40-TRAF2,3 blocking peptide exhibited diminished inflammatory infiltrate, an effect that was similar to that observed in Cd40$^{-/-}$ mice subjected to I/R (FIG. 3A, C). Taken together, the ri CD40-TRAF2,3 blocking peptide effectively protects against I/R-induced cell loss in the GCL and infiltration by MPO$^+$ leukocytes.

Intravitreal Administration of Ri CD40-TRAF2,3 Blocking Peptide Impairs I/R-Induced Upregulation of NOS2, COX-2, TNF-α and IL-1β

Figure 4:
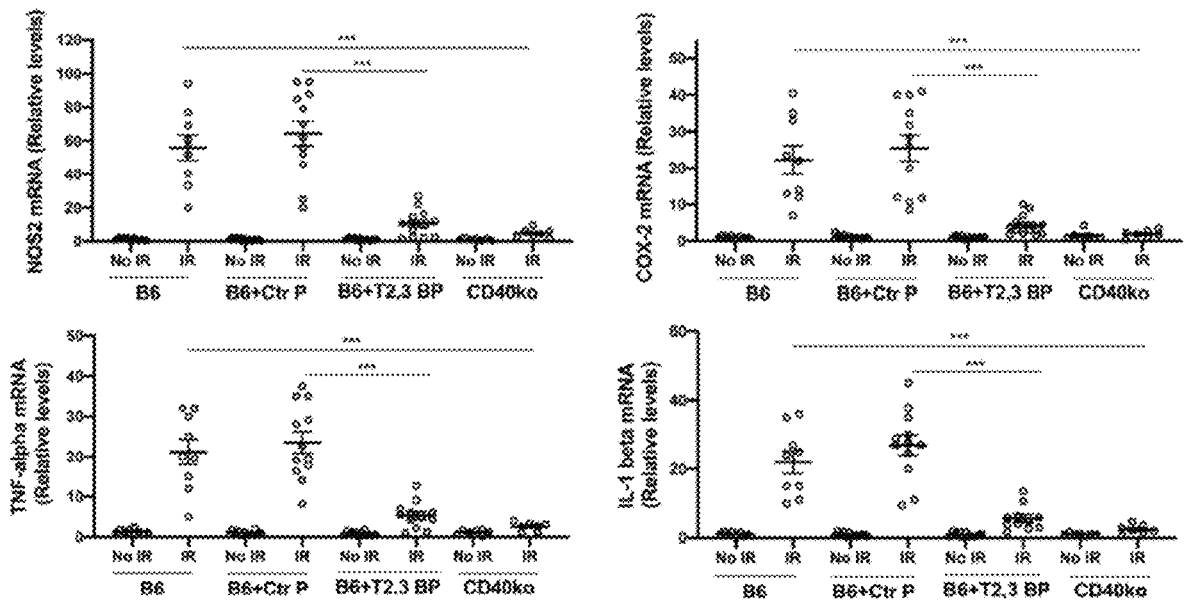
FIG. 4 illustrates plots showing ri CD40-TRAF2.3 blocking peptide impairs upregulation of NOS2, COX-2, TNF-α and IL-1B in retinas subjected to I/R. One eye of each mouse was treated as above and subjected to I/R. Eyes that underwent I/R and non-ischemic eyes were collected after 2 d. mRNA levels of NOS2, COX-2, TNF-α and IL-1β were assessed by quantitative real time PCR. Samples were normalized according to the content of 18S rRNA and one non-ischemic eye from a B6 mouse was given an arbitrary value of 1. Data are expressed as fold-increase compared to this animal. Horizontal bars represent mean±SEM (9-12 mice per group). *** $P<0.001$ by ANOVA.

Leukocytes recruited after ischemia express NOS2, COX-2 and pro-inflammatory cytokines (24, 38, 39). Moreover, retinopathy induced by I/R causes upregulation of NOS2. COX-2, TNF-α and IL-1β, molecules that are linked to the development of neuronal cell loss. Compared to contralateral non-ischemic eyes, eyes subjected to I/R after treatment with the control peptide upregulated NOS2, COX-2, TNF-α and IL-1β mRNA levels (FIG. 4). Eyes from B6 mice treated with ri CD40-TRAF2,3 blocking peptide exhibited impaired upregulation of NOS2, COX-2, TNF-α and IL-1β, an effect that was similar to that observed in Cd40-/- mice subjected to retinal I/R (FIG. 4).

Figure 5A:
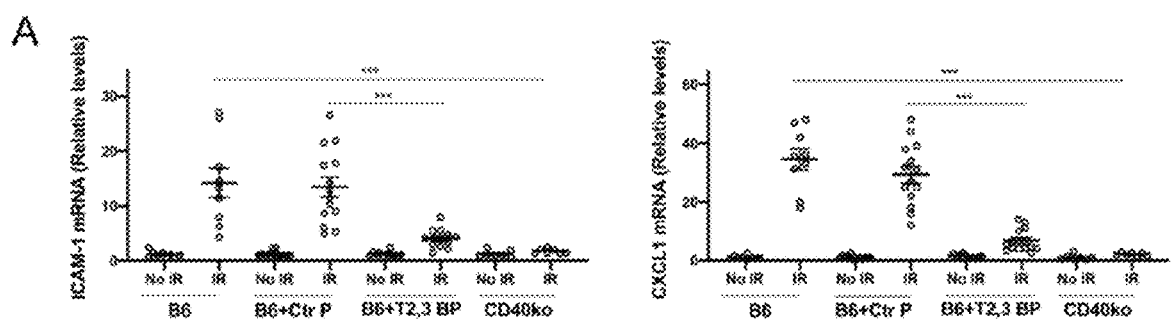
FIG. 5(A-C) illustrate plots and images showing ri CD40-TRAF2.3 blocking peptide impairs upregulation of ICAM-1 and CXCL1 in retinal endothelial cells and upregulation of NOS2 and CXCL1 in Müller cells from retinas subjected to I/R. One eye of each mouse was treated as above and subjected to I/R. Eyes that underwent I/R and non-ischemic eyes were collected after 2 d. A. mRNA levels of ICAM-1 and CXCL1 were assessed by quantitative real time PCR.
Figure 5B:
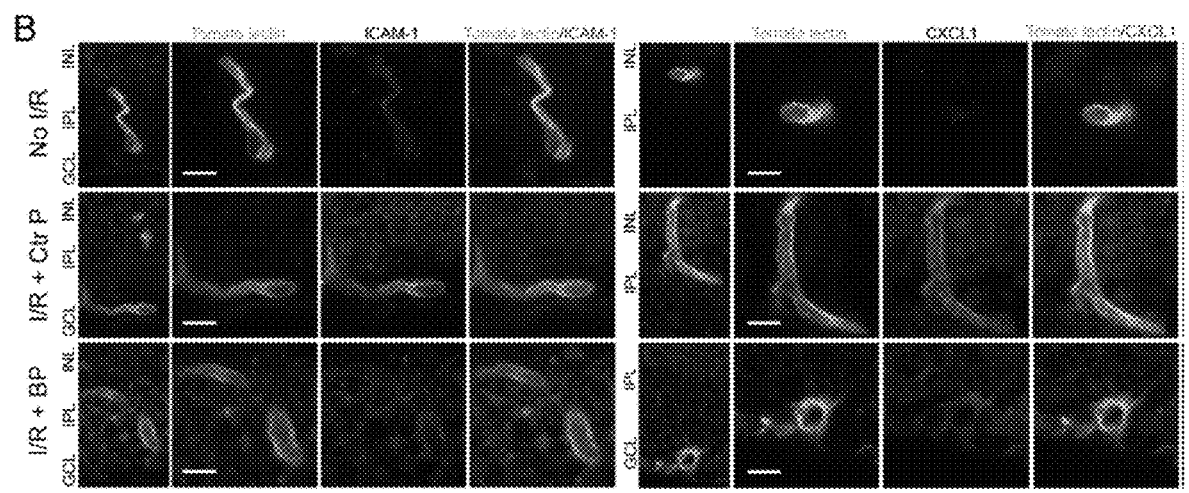

Intravitreal Administration of Ri CD40-TRAF2,3 Blocking Peptide Impairs I/R-Induced ICAM-1 and CXCL1 Upregulation in Retinal Endothelial Cells We examined the expression of ICAM-1 and CXCL1, molecules that are central to leukocyte recruitment and that are upregulated after retinal I/R. Retinas from B6 mice treated with the control peptide and subjected to I/R showed marked upregulation of ICAM-1 and CXCL1 mRNA levels (FIG. 5A). Administration of ri CD40-TRAF2,3 blocking peptide caused a significant reduction in ICAM-1 and CXCL1 mRNA levels that was similar to that observed in the retinas of Cd40$^{-/-}$ mice subjected to I/R (FIG. 5A). Next, we examined expression of these inflammatory molecules in retinal endothelial cells. Expression of ICAM-1 and CXCL1 were increased in retinal endothelial cells from mice that received control peptide (FIG. 5B). In agreement with mRNA data, mice treated with the ri CD40-TRAF2,3 blocking peptide had decreased expression of these molecules in retinal endothelial cells (FIG. 5B). Thus, the ri CD40-TRAF2,3 blocking peptide protected against I/R-induced upregulation of ICAM-1 and CXCL1 in retinal endothelial cells.

Figure 5C:
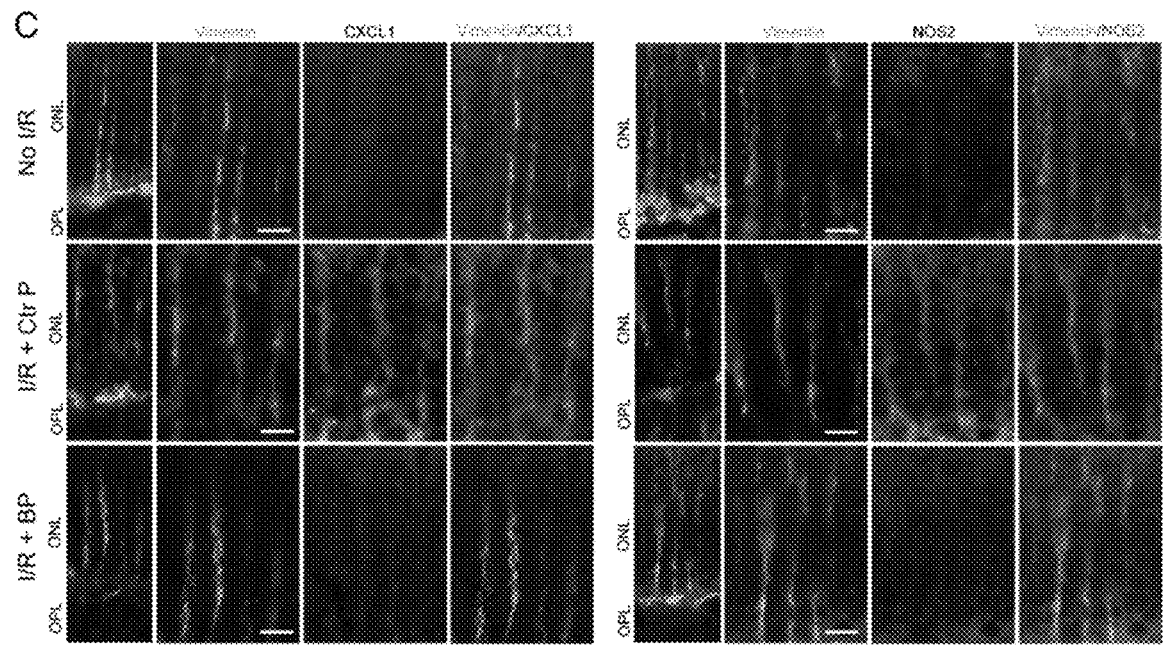
Figure 6A:
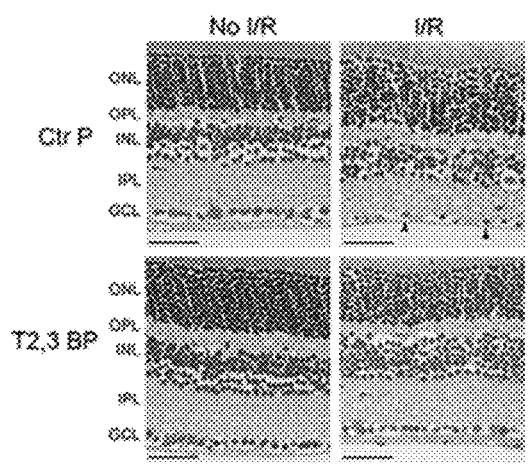
Figure 6B:
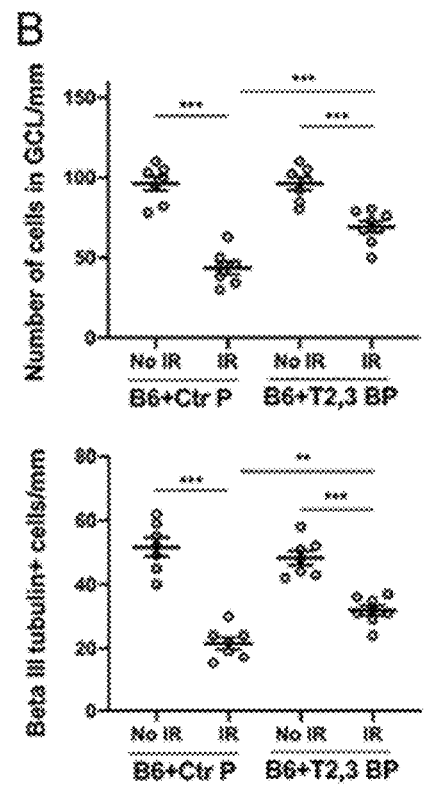
Figure 6C:
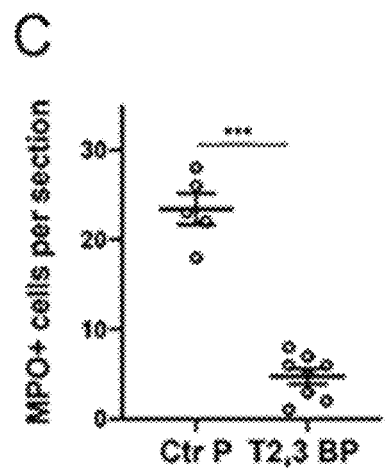
Figure 6D:
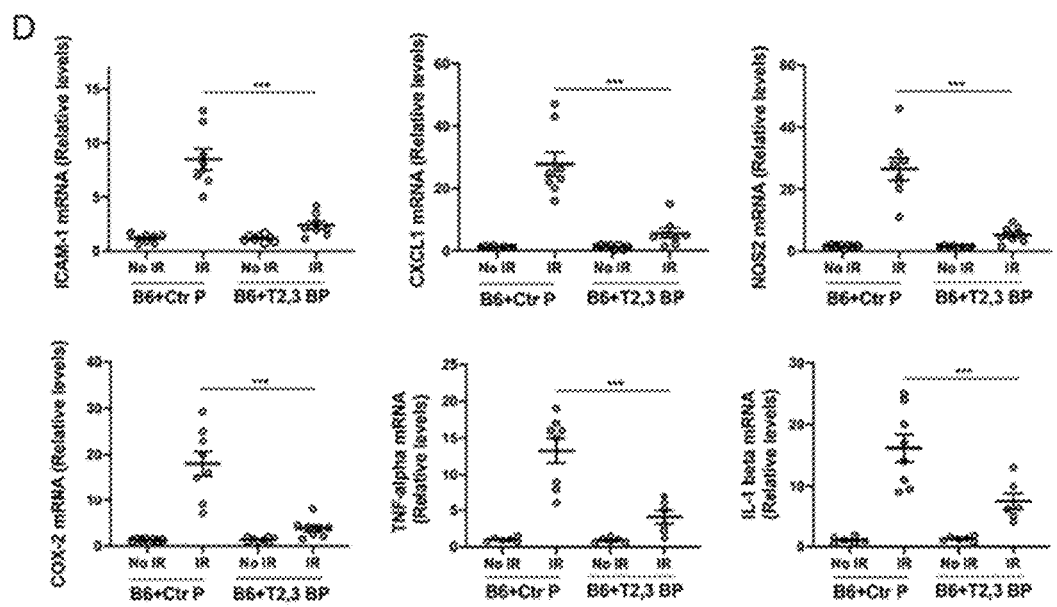

Intravitreal Administration of Ri CD40-TRAF2,3 Blocking Peptide Impairs I/R-Induced CXCL1 and NOS2 Upregulation in Müller Cells Retinal Müller cells are important for the development of inflammation in the retina. Moreover, it has been suggested that Müller cells upregulate NOS2 after retinal ischemia. NOS2 upregulation occurred in Müller cells from retinas subjected to I/R and treated with the control peptide (FIG. 5C). In addition, Müller cells from these retinas also exhibited increased CXCL1 expression (FIG. 5C). Treatment with ri CD40-TRAF2,3 blocking peptide impaired expression of these molecules in Müller cells from retinas subjected to I/R (FIG. 5C). Altogether, Müller cells from ischemic retinas upregulate NOS2 and CXCL1, an effect that was impaired by the ri CD40-TRAF2,3 blocking peptide.

Intravitreal Administration of Ri CD40-TRAF2,3 Blocking Peptide after I/R Protects Against Cell Loss in the GCL and Retinal Inflammatory Responses Control or ri CD40-TRAF2,3 blocking peptide were administered 90 min post-retinal ischemia. As shown in FIG. 6, the blocking peptide protected against cell loss in the GCL, loss of β-III tubulin$^+$ cells, recruitment of MPO$^+$ leukocytes, and upregulation of ICAM-1. CXCL1, NOS2, COX-2, TNF-α and IL-1β. Thus, ri CD40-TRAF2,3 blocking peptide is effective in ameliorating the development of inflammation and neuronal loss even if administered after induction of retinal ischemia.

Figure 7A:
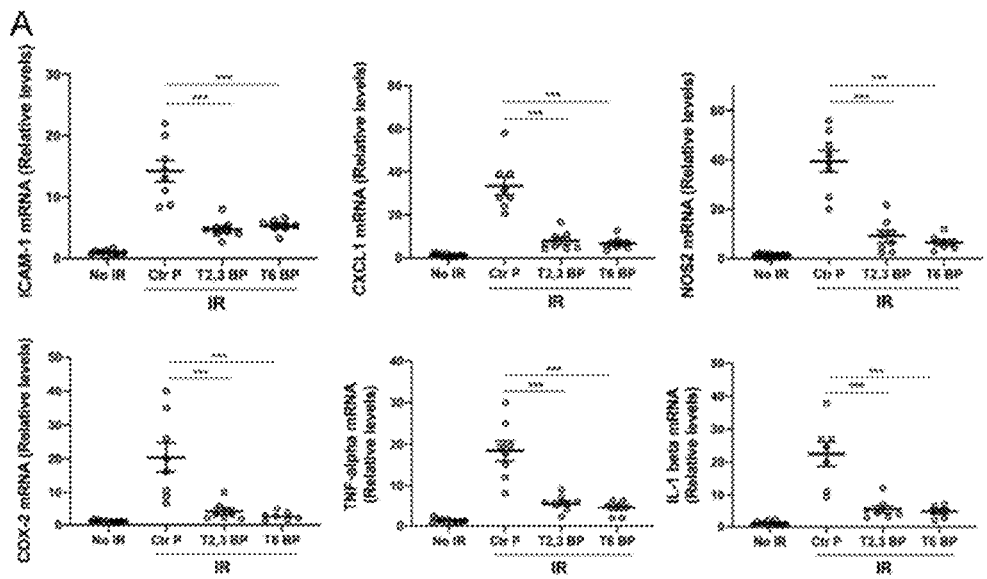
Figure 11A:
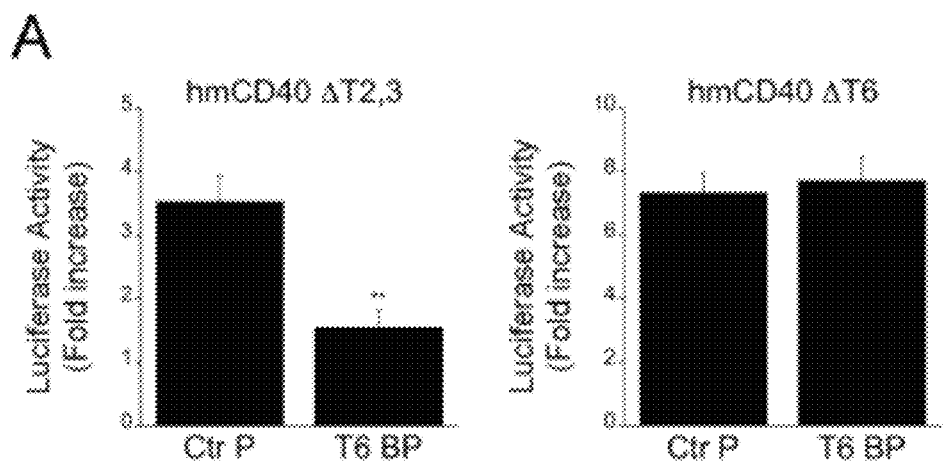
Figure 11B:
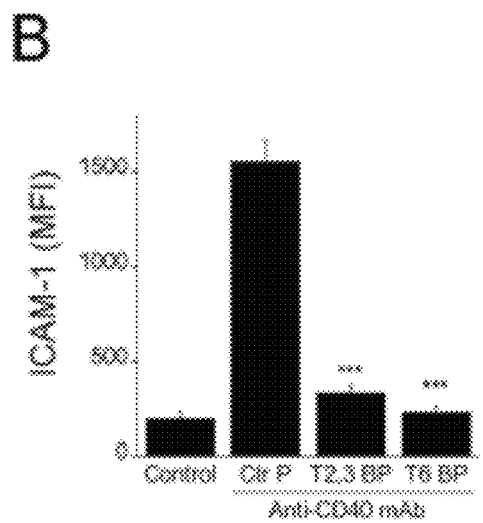

Intravitreal Administration of Ri CD40-TRAF6 Blocking Peptide Impairs Retinal Inflammatory Responses Induced by I/R but Exacerbates an Infectious Retinitis Pharmacologic inhibition of CD40-TRAF6 reduces CD40-driven inflammation. However, this pathway also drives responses key for protection against opportunistic pathogens. We generated ri cell permeable peptide that consists of the amino acid sequence of the TRAF6 binding site of mouse CD40 fused with HIV TAT$_{47-57}$ to examine its effects in I/R-induced retinopathy. The ri CD40-TRAF6 blocking peptide inhibited CD154-induced NF-κB activity only in cells that expressed CD40 that signals through the TRAF6 binding site (FIG. 11A). The peptide also inhibited CD40-driven ICAM-1 upregulation in mouse retinal endothelial cells (FIG. 11B). Intravitreal administration of the ri CD40-TRAF6 blocking peptide ameliorated upregulation of pro-inflammatory molecules in retinas subjected to I/R in a manner similar to that observed after administration of the CD40-TRAF2,3 blocking peptide (FIG. 7A).

Figure 11C:
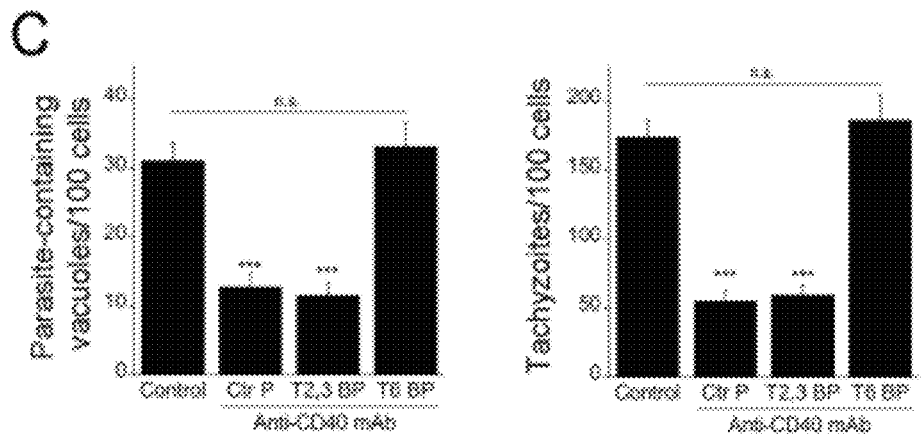

The CD40-CD154 pathway is essential for control of toxoplasmosis in humans and mice. *Toxoplasma gondii* infects ⅓ of the world population and is one of the most common causes of infectious retinitis worldwide. Ocular toxoplasmosis can occur either as reactivation of the chronic (quiescent) phase of infection or as a manifestation of acute infection. We examined the effects of the CD40-TRAF blocking peptides on CD40-dependent induction of toxoplasmacidal activity within infected cells, an important mechanism by which CD40 promotes resistance against toxoplasmosis. In contrast to the CD40-TRAF2,3 blocking peptide, the CD40-TRAF6 blocking peptide markedly impaired *T. gondii* killing induced by CD40 ligation (FIG. 11C). These results are in agreement with the effects of genetic blockade of CD40-TRAF6 signaling (cells that express CD40 ΔT6) on *T. gondii* infection. Next, we examined the effects of the peptides in ocular toxoplasmosis. While intravitreal administration of the CD40-TRAF2,3 blocking peptide to *T. gondii*-infected mice had no effect on parasite load and retinal histopathology, both of these parameters were worsened in mice treated with the CD40-

Figure 7B:
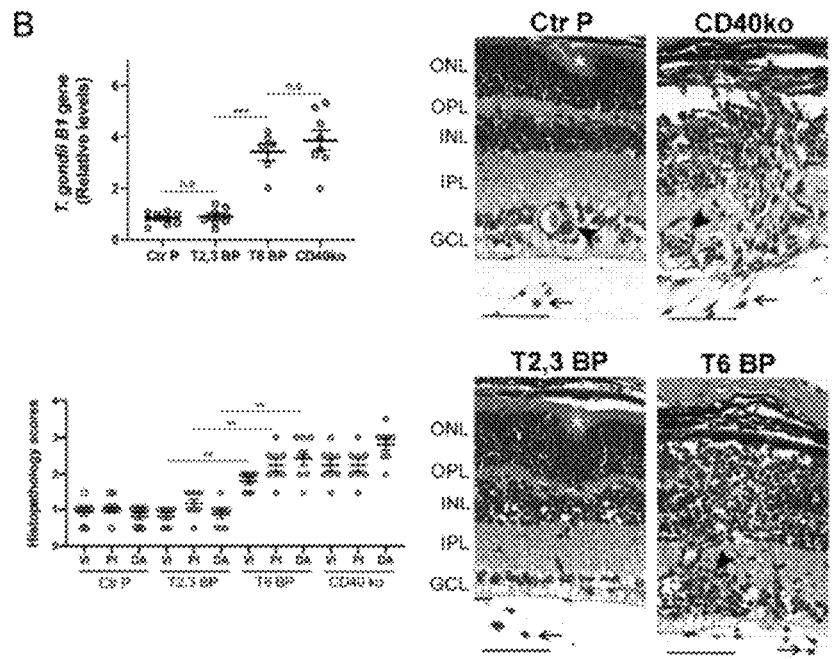
Figure 12A:
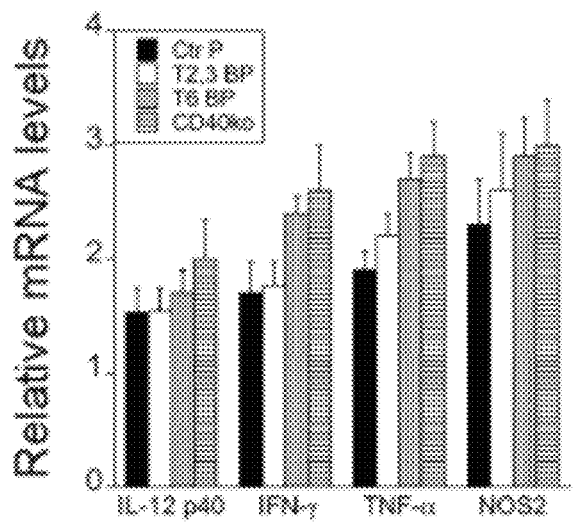
Figure 12B:
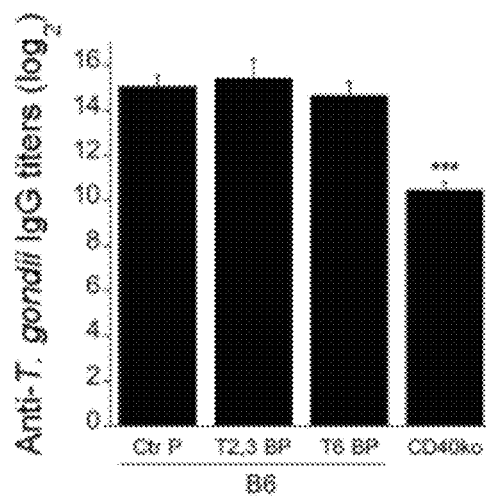
Figure 13A:
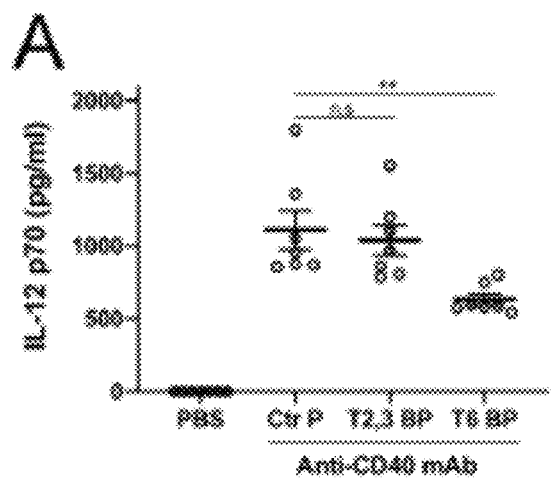
Figure 13B:
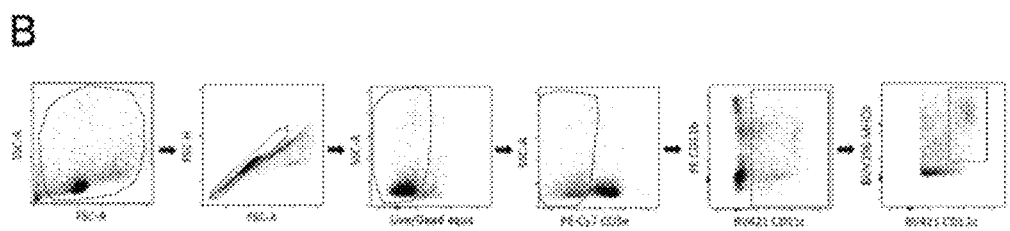
Figure 13C:
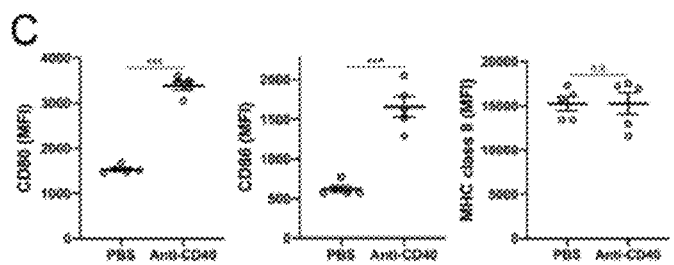
Figure 13D:
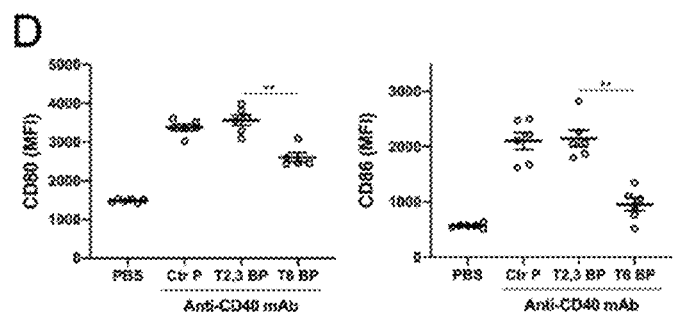

TRAF6 blocking peptide as well as in Cd40$^{-/-}$ mice (FIG. 7B). Similar to Cd40-/- mice, the CD40-TRAF6 blocking peptide did not appear to impair expression of immune mediators of protection against ocular toxoplasmosis (FIG. 12A). Contrary to Cd40'-mice, neither peptide affected production of anti-*T. gondii* IgG (FIG. 12B). Thus, in contrast to the ri CD40-TRAF6 blocking peptide, the ri CD40-TRAF2,3 blocking peptide did not impair CD40-driven toxoplasmacidal activity and did not increase susceptibility to this opportunistic pathogen in the retina.

the Ri CD40-TRAF6 Blocking Peptide but not the Ri CD40-TRAF2,3 Blocking Peptide Impairs CD40-Driven Systemic IL-12 Production and Dendritic Cell Activation While *T. gondii* can induce expression of effector molecules of cellular immunity even in the absence of CD40, this molecule directly induces IL-12 production and dendritic cell activation, responses that likely promote protection against other opportunistic pathogens. We began to examine the effects of the blocking peptides in these responses using a model of systemic administration of a stimulatory anti-CD40 mAb. As previously reported, i.p. administration of anti-CD40 mAb induced serum levels of IL-12 p70 (FIG. 13A). This response was inhibited by i.p. administration of ri CD40-TRAF6 blocking peptide but not the ri CD40-TRAF2,3 blocking peptide (FIG. 13A). The anti-CD40 mAb also upregulated CD80 and CD86 in splenic dendritic cells, but did not increase the high-level basal expression of MHC II (FIG. 13B). CD40-driven CD80 and CD86 upregulation were inhibited only by administration of ri CD40-TRAF6 blocking peptide (FIG. 12C). Thus, the ri CD40-TRAF2,3 blocking peptide does not appear to impair CD40-dependent systemic IL-12 p70 production and dendritic cell activation.

Studies in mice indicate that CD40 is a molecular target for treatment of various inflammatory and neuro-degenerative disorders. However, there is a need to find new therapeutic approaches to inhibit CD40 signaling in humans since administration of neutralizing anti-CD154 mAbs was problematic due to the development of thrombo-embolic events. Moreover, generalized inhibition of CD40 signaling or inhibition of CD40-TRAF6 signaling are expected to increase the risk of infections caused by pathogens controlled by cell-mediated immunity. We show that inflammation can be controlled by pharmacologic inhibition of CD40-TRAF2,3 signaling. Moreover, in contrast to inhibition of CD40-TRAF6 signaling, inhibition of CD40-TRAF2,3 signaling had no detectable effect on susceptibility to the opportunistic pathogen *T. gondii* and did not appear to alter IL-12 p70 production and dendritic cell activation. These findings suggest that pharmacologic inhibition of CD40-TRAF2,3 signaling will be less likely to increase susceptibility to opportunistic infections than global blockade of CD40 or inhibition of CD40-TRAF6.

Using a model of retinal I/R, we show that a ri cell-penetrating CD40-TRAF2,3 blocking peptide markedly diminished ICAM-1 and CXCL1 upregulation and reduced leukocyte infiltration yielding a phenotype similar to that observed in Cd40"-mice subjected to retinal I/R. The in vivo effects of the ri blocking peptide correlate with the in vitro studies showing that CD40-TRAF2,3 signaling is crucial for adhesion molecule and chemokine upregulation in a broad range of cells. In addition, given that infiltrating leukocytes express NOS2, COX-2 and pro-inflammatory cytokines, the reduction in leukocyte recruitment likely contributes to the reduced expression of molecules linked to neural cell death. Taken together, these results indicate that inhibition of CD40-TRAF2,3 after ischemia protected against inflammation and achieved neuro-protection.

CD40 is an important driver of inflammation and pathology not only in retinal ischemia but also in ischemic injury of the brain and other organs. Like in the retina, ischemia in these organs leads to CD40-driven upregulation of chemokines and adhesion molecules, promoting leukocyte recruitment and tissue injury. While recruitment of leukocyte subsets such as macrophages, microglia and lymphocytes can play either a detrimental role (impair blood brain barrier integrity, aggravate neuron injury, secrete pro-inflammatory cytokines) or a protective role (phagocytose cell debris, express anti-inflammatory cytokines and neuroprotectants) after cerebral ischemia, several studies support the deleterious role of infiltrating PMN. Indeed, PMNs can be key mediators of injury after I/R and blockade of ICAM-1 or CXCL1 protects against inflammation and organ injury after I/R. Whereas it remains to be determined whether approaches to impair inflammatory responses can yield beneficial effects in patients with ischemic stroke, strategies that target adhesion molecules or chemokines have been found to be effective against other inflammatory disorders. The fundamental role of adhesion molecule and chemokine upregulation in inflammatory disorders supports that pharmacologic blockade of CD40-TRAF2,3 will likely control CD40-driven inflammatory disorders besides those triggered by ischemia.

Müller cells acquire expression of pro-inflammatory molecules that appear to include NOS2 in retinopathies. The present work indicates that Müller cells express NOS2 and CXCL1 in the ischemic retina. Moreover, pharmacologic inhibition of the CD40-TRAF2,3 pathway reduces expression of these molecules in Müller cells. Of relevance, in vitro studies in Müller cells that express CD40 with mutations in CD40-TRAF2,3 binding site or Müller cells treated with a CD40-TRAF2,3 blocking peptide revealed that the CD40-TRAF2,3 pathway is a major inducer of pro-inflammatory responses in Müller cells.

The need to find novel approaches to treat CD40-driven inflammatory disorders together with the central role of TRAFs as mediators of the effects of CD40 emphasize the importance of examining inhibition of CD40-TRAF signaling for potential therapeutic applications. Our studies uncovered that CD40-TRAF2,3 signaling is critical to development of inflammation and neuronal cell loss. Moreover, inhibition of CD40-TRAF2,3 pathway did not increase susceptibility to an opportunistic pathogen. This finding is important since, whereas general inhibition of CD40 signaling (blocking anti-CD154 or anti-CD40 mAbs), inhibition of CD40-TRAF2,3 or CD40-TRAF6 signaling may impair antibody production, opportunistic pathogens rather than pathogens controlled by humoral immunity are the most important cause of death in patients without functional CD40-CD154 signaling. In contrast to blockade of CD40-TRAF2,3, the inhibition of CD40 or CD40-TRAF6 signaling would impair effector mechanisms that control opportunistic pathogens. Of note, a pharmacologic inhibitor of CD40-TRAF6 was reported not to affect antigen-driven T cell proliferation. However, those studies were done using previously matured dendritic cells, thus likely bypassing CD40-induced dendritic cell activation, a key function of CD40 during dendritic cell-T cell interaction.

Given that $TAT_{47-57}$-based CD40-TRAF2,3 blocking peptide inhibits CD40-TRAF2.3 signaling and CD40-dependent pro-inflammatory responses in vitro, we generated a ri peptide as a pharmacologic approach to block CD40-TRAF2,3 signaling in vivo. Intravitreal administration of this peptide is an attractive approach for the treatment of ocular disorders (e.g., ischemic retinopathies, diabetic retinopathy and glaucoma) since $TAT_{47-57}$-based ri cell-penetrating peptides are good tools for transporting molecules into retinal cells and they persist in the retina for at least 14 d after a single intravitreal injection. Moreover, the CD40-TRAF2,3 blocking peptide did not impair control of *T. gondii* in the retina, an important finding given the high prevalence of chronic *T. gondii* infection worldwide.

From the above description of the invention, those skilled in the art will perceive improvements, changes and modifications. Such improvements, changes and modifications are within the skill of the art and are intended to be covered by the appended claims. All publications, patents, and patent applications cited in the present application are herein incorporated by reference in their entirety.

The invention claimed is:

1. A composition comprising:
a cell-penetrating peptide that includes a membrane transduction domain linked to a CD40-TRAF2,3 blocking peptide that competitively inhibits binding of TRAF 2 to the TRAF2,3 binding domain, wherein the CD40-TRAF2,3 blocking peptide does not include the amino acid sequence of PVQET (SEQ ID NO: 10) or a retro-inverso amino acid sequence thereof, and wherein the CD40-TRAF2,3 blocking peptide comprises a polypeptide having an amino acid sequence of SEQ ID NO: 9 or a retro inverso amino acid sequence thereof, wherein
$X_1$ is not P if $X_2$ is V and $X_3$ is T;
$X_2$ is not V if $X_1$ is P and $X_3$ is T;
$X_3$ is not T if $X_1$ is P and $X_2$ is V.

2. The composition of claim 1, the CD40-TRAF2,3 blocking peptide having an amino acid sequence selected from SEQ ID NO: 11, SEQ ID NO: 12, SEQ ID NO: 13, SEQ ID NO: 14: SEQ ID NO: 15, SEQ ID NO: 16, SEQ ID NO: 17, SEQ ID NO: 18, SEQ ID NO: 19, SEQ ID NO: 20, SEQ ID NO: 21: SEQ ID NO: 22, SEQ ID NO: 23, or SEQ ID NO: 24.

3. The composition of claim 1, further comprising a pharmaceutically acceptable carrier.

4. A composition comprising:
a cell-penetrating peptide that competitively inhibits binding of TRAF2 to the TRAF2,3 binding domain of CD40 of cells, the cell-penetrating peptide comprising a membrane transduction domain linked to a CD40-TRAF2,3 blocking peptide, wherein the CD40-TRAF2,3 blocking peptide does not include the amino acid sequence of PVQET (SEQ ID NO: 10) or a retro-inverso amino acid sequence thereof, and
wherein the CD40-TRAF2,3 blocking peptide comprises a polypeptide having an amino acid sequence of SEQ ID NO: 9 or a retro inverso amino acid sequence thereof, wherein
$X_1$ is not P if $X_2$ is V and $X_3$ is T;
$X_2$ is not V if $X_1$ is P and $X_3$ is T;
$X_3$ is not T if $X_1$ is P and $X_2$ is V.

5. The composition of claim 4, the CD40-TRAF2,3 blocking peptide having an amino acid sequence selected from SEQ ID NO: 11, SEQ ID NO: 12, SEQ ID NO: 13, SEQ ID NO: 14: SEQ ID NO: 15, SEQ ID NO: 16, SEQ ID NO: 17, SEQ ID NO: 18, SEQ ID NO: 19, SEQ ID NO: 20, SEQ ID NO: 21: SEQ ID NO: 22, SEQ ID NO: 23, or SEQ ID NO: 24.

6. The composition of claim 4, further comprising a pharmaceutically acceptable carrier.

* * * * *

SEQUENCE LISTING

```
<160> NUMBER OF SEQ ID NOS: 45

<210> SEQ ID NO 1
<211> LENGTH: 5
<212> TYPE: PRT
<213> ORGANISM: Artificial Sequence
<220> FEATURE:
<223> OTHER INFORMATION: Synthetic Construct

<400> SEQUENCE: 1

Pro Val Gln Glu Thr
1               5

<210> SEQ ID NO 2
<211> LENGTH: 34
<212> TYPE: PRT
<213> ORGANISM: Artificial Sequence
<220> FEATURE:
<223> OTHER INFORMATION: Synthetic Construct

<400> SEQUENCE: 2

Asn Ala Ala Thr Ala Thr Arg Gly Arg Ser Ala Ala Ser Arg Pro Thr
1               5                   10                  15

Glu Arg Pro Arg Ala Pro Ala Arg Ser Ala Ser Arg Pro Arg Arg Pro
            20                  25                  30

Val Glu

<210> SEQ ID NO 3
<211> LENGTH: 15
<212> TYPE: PRT
<213> ORGANISM: Artificial Sequence
<220> FEATURE:
<223> OTHER INFORMATION: Synthetic Construct

<400> SEQUENCE: 3

Cys Gly Arg Lys Lys Arg Arg Gln Arg Arg Pro Pro Gln Cys
1               5                   10                  15

<210> SEQ ID NO 4
<211> LENGTH: 9
<212> TYPE: PRT
<213> ORGANISM: Artificial Sequence
<220> FEATURE:
<223> OTHER INFORMATION: Synthetic Construct

<400> SEQUENCE: 4

Arg Lys Lys Arg Arg Gln Arg Arg Arg
1               5

<210> SEQ ID NO 5
<211> LENGTH: 11
<212> TYPE: PRT
<213> ORGANISM: Artificial Sequence
<220> FEATURE:
<223> OTHER INFORMATION: Synthetic Construct
```

```
<400> SEQUENCE: 5

Tyr Gly Arg Lys Lys Arg Arg Gln Arg Arg
1               5                   10

<210> SEQ ID NO 6
<211> LENGTH: 16
<212> TYPE: PRT
<213> ORGANISM: Artificial Sequence
<220> FEATURE:
<223> OTHER INFORMATION: Synthetic Construct

<400> SEQUENCE: 6

Arg Gln Ile Lys Ile Trp Phe Gln Asn Arg Arg Met Lys Trp Lys Lys
1               5                   10                  15

<210> SEQ ID NO 7
<211> LENGTH: 26
<212> TYPE: PRT
<213> ORGANISM: Artificial Sequence
<220> FEATURE:
<223> OTHER INFORMATION: Synthetic Construct

<400> SEQUENCE: 7

Gly Trp Thr Leu Asn Ser Ala Gly Tyr Leu Leu Lys Ile Asn Leu Lys
1               5                   10                  15

Ala Leu Ala Ala Leu Ala Lys Lys Ile Leu
            20                  25

<210> SEQ ID NO 8
<211> LENGTH: 18
<212> TYPE: PRT
<213> ORGANISM: Artificial Sequence
<220> FEATURE:
<223> OTHER INFORMATION: Synthetic Construct

<400> SEQUENCE: 8

Lys Leu Ala Leu Lys Leu Ala Leu Lys Ala Leu Lys Ala Ala Leu Lys
1               5                   10                  15

Leu Ala

<210> SEQ ID NO 9
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: Xaa is Pro or His
<220> FEATURE:
<221> NAME/KEY: MOD_RES
<222> LOCATION: (2)..(2)
<223> OTHER INFORMATION: Xaa is Val, Ile, or Thr
<220> FEATURE:
<221> NAME/KEY: MOD_RES
<222> LOCATION: (5)..(5)
<223> OTHER INFORMATION: Xaa is Thr or Ser

<400> SEQUENCE: 9

Xaa Xaa Gln Glu Xaa
1               5

<210> SEQ ID NO 10
<211> LENGTH: 5
<212> TYPE: PRT
```

```
<213> ORGANISM: Artificial Sequence
<220> FEATURE:
<223> OTHER INFORMATION: Synthetic Construct

<400> SEQUENCE: 10

Pro Val Gln Glu Thr
1               5

<210> SEQ ID NO 11
<211> LENGTH: 13
<212> TYPE: PRT
<213> ORGANISM: Artificial Sequence
<220> FEATURE:
<223> OTHER INFORMATION: Synthetic Construct

<400> SEQUENCE: 11

Ser Asn Thr Ala Ala His Val Gln Glu Thr Leu His Gly
1               5                   10

<210> SEQ ID NO 12
<211> LENGTH: 13
<212> TYPE: PRT
<213> ORGANISM: Artificial Sequence
<220> FEATURE:
<223> OTHER INFORMATION: Synthetic Construct

<400> SEQUENCE: 12

Ser Asn Thr Ala Ala His Ile Gln Glu Thr Leu His Gly
1               5                   10

<210> SEQ ID NO 13
<211> LENGTH: 13
<212> TYPE: PRT
<213> ORGANISM: Artificial Sequence
<220> FEATURE:
<223> OTHER INFORMATION: Synthetic Construct

<400> SEQUENCE: 13

Ser Asn Thr Ala Ala His Val Gln Glu Ser Leu His Gly
1               5                   10

<210> SEQ ID NO 14
<211> LENGTH: 13
<212> TYPE: PRT
<213> ORGANISM: Artificial Sequence
<220> FEATURE:
<223> OTHER INFORMATION: Synthetic Construct

<400> SEQUENCE: 14

Ser Asn Thr Ala Ala His Ile Gln Glu Ser Leu His Gly
1               5                   10

<210> SEQ ID NO 15
<211> LENGTH: 13
<212> TYPE: PRT
<213> ORGANISM: Artificial Sequence
<220> FEATURE:
<223> OTHER INFORMATION: Synthetic Construct

<400> SEQUENCE: 15

Ser Asn Thr Ala Ala Pro Ile Gln Glu Thr Leu His Gly
1               5                   10

<210> SEQ ID NO 16
<211> LENGTH: 13
<212> TYPE: PRT
<213> ORGANISM: Artificial Sequence
```

-continued

```
<220> FEATURE:
<223> OTHER INFORMATION: Synthetic Construct

<400> SEQUENCE: 16

Ser Asn Thr Ala Ala Pro Ile Gln Glu Ser Leu His Gly
1               5                   10

<210> SEQ ID NO 17
<211> LENGTH: 13
<212> TYPE: PRT
<213> ORGANISM: Artificial Sequence
<220> FEATURE:
<223> OTHER INFORMATION: Synthetic Construct

<400> SEQUENCE: 17

Ser Asn Thr Ala Ala Pro Val Gln Glu Ser Leu His Gly
1               5                   10

<210> SEQ ID NO 18
<211> LENGTH: 12
<212> TYPE: PRT
<213> ORGANISM: Artificial Sequence
<220> FEATURE:
<223> OTHER INFORMATION: Synthetic Construct

<400> SEQUENCE: 18

Asn Thr Ala Ala His Val Gln Glu Thr Leu His Gly
1               5                   10

<210> SEQ ID NO 19
<211> LENGTH: 14
<212> TYPE: PRT
<213> ORGANISM: Artificial Sequence
<220> FEATURE:
<223> OTHER INFORMATION: Synthetic Construct

<400> SEQUENCE: 19

Asp Leu Pro Gly Ser Asn Thr Ala Ala His Val Gln Glu Thr
1               5                   10

<210> SEQ ID NO 20
<211> LENGTH: 13
<212> TYPE: PRT
<213> ORGANISM: Artificial Sequence
<220> FEATURE:
<223> OTHER INFORMATION: Synthetic Construct

<400> SEQUENCE: 20

Asn Thr Ala Ala His Val Gln Glu Thr Leu His Gly Cys
1               5                   10

<210> SEQ ID NO 21
<211> LENGTH: 12
<212> TYPE: PRT
<213> ORGANISM: Artificial Sequence
<220> FEATURE:
<223> OTHER INFORMATION: Synthetic Construct

<400> SEQUENCE: 21

Asn Thr Ala Ala His Val Gln Glu Thr Leu His Gly
1               5                   10

<210> SEQ ID NO 22
<211> LENGTH: 11
<212> TYPE: PRT
<213> ORGANISM: Artificial Sequence
<220> FEATURE:
```

<223> OTHER INFORMATION: Synthetic Construct

<400> SEQUENCE: 22

Asn Thr Ala Ala His Val Gln Glu Thr Leu His
1               5                   10

<210> SEQ ID NO 23
<211> LENGTH: 10
<212> TYPE: PRT
<213> ORGANISM: Artificial Sequence
<220> FEATURE:
<223> OTHER INFORMATION: Synthetic Construct

<400> SEQUENCE: 23

Asn Thr Ala Ala His Val Gln Glu Thr Leu
1               5                   10

<210> SEQ ID NO 24
<211> LENGTH: 9
<212> TYPE: PRT
<213> ORGANISM: Artificial Sequence
<220> FEATURE:
<223> OTHER INFORMATION: Synthetic Construct

<400> SEQUENCE: 24

Asn Thr Ala Ala His Val Gln Glu Thr
1               5

<210> SEQ ID NO 25
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: Xaa is Thr or Ser
<220> FEATURE:
<221> NAME/KEY: MOD_RES
<222> LOCATION: (4)..(4)
<223> OTHER INFORMATION: Xaa is Val, Ile, or Thr
<220> FEATURE:
<221> NAME/KEY: MOD_RES
<222> LOCATION: (5)..(5)
<223> OTHER INFORMATION: Xaa is Pro or His

<400> SEQUENCE: 25

Xaa Glu Gln Xaa Xaa
1               5

<210> SEQ ID NO 26
<211> LENGTH: 5
<212> TYPE: PRT
<213> ORGANISM: Artificial Sequence
<220> FEATURE:
<223> OTHER INFORMATION: Synthetic Construct

<400> SEQUENCE: 26

Thr Glu Gln Val Pro
1               5

<210> SEQ ID NO 27
<211> LENGTH: 13
<212> TYPE: PRT
<213> ORGANISM: Artificial Sequence
<220> FEATURE:
<223> OTHER INFORMATION: Synthetic Construct

<400> SEQUENCE: 27

Gly His Leu Thr Glu Gln Val His Ala Ala Thr Asn Ser
1               5                   10

<210> SEQ ID NO 28
<211> LENGTH: 13
<212> TYPE: PRT
<213> ORGANISM: Artificial Sequence
<220> FEATURE:
<223> OTHER INFORMATION: Synthetic Construct

<400> SEQUENCE: 28

Gly His Leu Thr Glu Gln Ile His Ala Ala Thr Asn Ser
1               5                   10

<210> SEQ ID NO 29
<211> LENGTH: 13
<212> TYPE: PRT
<213> ORGANISM: Artificial Sequence
<220> FEATURE:
<223> OTHER INFORMATION: Synthetic Construct

<400> SEQUENCE: 29

Gly His Leu Ser Glu Gln Val His Ala Ala Thr Asn Ser
1               5                   10

<210> SEQ ID NO 30
<211> LENGTH: 13
<212> TYPE: PRT
<213> ORGANISM: Artificial Sequence
<220> FEATURE:
<223> OTHER INFORMATION: Synthetic Construct

<400> SEQUENCE: 30

Gly His Leu Ser Glu Gln Ile His Ala Ala Thr Asn Ser
1               5                   10

<210> SEQ ID NO 31
<211> LENGTH: 13
<212> TYPE: PRT
<213> ORGANISM: Artificial Sequence
<220> FEATURE:
<223> OTHER INFORMATION: Synthetic Construct

<400> SEQUENCE: 31

Gly His Leu Thr Glu Gln Ile Pro Ala Ala Thr Asn Ser
1               5                   10

<210> SEQ ID NO 32
<211> LENGTH: 13
<212> TYPE: PRT
<213> ORGANISM: Artificial Sequence
<220> FEATURE:
<223> OTHER INFORMATION: Synthetic Construct

<400> SEQUENCE: 32

Gly His Leu Ser Glu Gln Ile Pro Ala Ala Thr Asn Ser
1               5                   10

<210> SEQ ID NO 33
<211> LENGTH: 13
<212> TYPE: PRT
<213> ORGANISM: Artificial Sequence
<220> FEATURE:
<223> OTHER INFORMATION: Synthetic Construct

```
<400> SEQUENCE: 33

Gly His Leu Ser Glu Gln Val Pro Ala Ala Thr Asn Ser
1               5                   10

<210> SEQ ID NO 34
<211> LENGTH: 12
<212> TYPE: PRT
<213> ORGANISM: Artificial Sequence
<220> FEATURE:
<223> OTHER INFORMATION: Synthetic Construct

<400> SEQUENCE: 34

Gly His Leu Thr Glu Gln Val His Ala Ala Thr Asn
1               5                   10

<210> SEQ ID NO 35
<211> LENGTH: 24
<212> TYPE: PRT
<213> ORGANISM: Artificial Sequence
<220> FEATURE:
<223> OTHER INFORMATION: Synthetic Construct

<400> SEQUENCE: 35

Ser Asn Thr Ala Ala His Val Gln Glu Thr Leu His Gly Tyr Gly Arg
1               5                   10                  15

Lys Lys Arg Arg Gln Arg Arg Arg
            20

<210> SEQ ID NO 36
<211> LENGTH: 23
<212> TYPE: PRT
<213> ORGANISM: Artificial Sequence
<220> FEATURE:
<223> OTHER INFORMATION: Synthetic Construct

<400> SEQUENCE: 36

Asn Thr Ala Ala His Val Gln Glu Thr Leu His Gly Tyr Gly Arg Lys
1               5                   10                  15

Lys Arg Arg Gln Arg Arg Arg
            20

<210> SEQ ID NO 37
<211> LENGTH: 29
<212> TYPE: PRT
<213> ORGANISM: Artificial Sequence
<220> FEATURE:
<223> OTHER INFORMATION: Synthetic Construct

<400> SEQUENCE: 37

Ala Ala Val Ala Leu Leu Pro Ala Val Leu Leu Ala Leu Leu Ala Pro
1               5                   10                  15

Ser Asn Thr Ala Ala His Val Gln Glu Thr Leu His Gly
            20                  25

<210> SEQ ID NO 38
<211> LENGTH: 23
<212> TYPE: PRT
<213> ORGANISM: Artificial Sequence
<220> FEATURE:
<223> OTHER INFORMATION: Synthetic Construct

<400> SEQUENCE: 38

Asn Thr Ala Ala His Val Gln Glu Thr Leu His Gly Tyr Gly Arg Lys
1               5                   10                  15
```

Lys Arg Arg Gln Arg Arg Arg
            20

<210> SEQ ID NO 39
<211> LENGTH: 28
<212> TYPE: PRT
<213> ORGANISM: Artificial Sequence
<220> FEATURE:
<223> OTHER INFORMATION: Synthetic Construct

<400> SEQUENCE: 39

Gly His Leu Thr Glu Gln Val His Ala Ala Thr Asn Pro Ala Leu Leu
1               5                   10                  15

Ala Leu Leu Val Ala Pro Leu Leu Ala Val Ala Ala
            20                  25

<210> SEQ ID NO 40
<211> LENGTH: 23
<212> TYPE: PRT
<213> ORGANISM: Artificial Sequence
<220> FEATURE:
<223> OTHER INFORMATION: Synthetic Construct

<400> SEQUENCE: 40

Arg Arg Arg Gln Arg Arg Lys Lys Arg Gly Tyr Gly His Leu Thr Glu
1               5                   10                  15

Gln Val His Ala Ala Thr Asn
            20

<210> SEQ ID NO 41
<211> LENGTH: 10
<212> TYPE: PRT
<213> ORGANISM: Artificial Sequence
<220> FEATURE:
<223> OTHER INFORMATION: Synthetic Construct

<400> SEQUENCE: 41

Arg Arg Gln Asp Ala Gln Glu Met Glu Asp
1               5                   10

<210> SEQ ID NO 42
<211> LENGTH: 10
<212> TYPE: PRT
<213> ORGANISM: Artificial Sequence
<220> FEATURE:
<223> OTHER INFORMATION: Synthetic Construct

<400> SEQUENCE: 42

Asp Glu Met Glu Gln Ala Asp Gln Arg Arg
1               5                   10

<210> SEQ ID NO 43
<211> LENGTH: 21
<212> TYPE: PRT
<213> ORGANISM: Artificial Sequence
<220> FEATURE:
<223> OTHER INFORMATION: Synthetic Construct

<400> SEQUENCE: 43

Arg Arg Gln Asp Ala Gln Glu Met Glu Asp Tyr Gly Arg Lys Lys Arg
1               5                   10                  15

Arg Gln Arg Arg Arg
            20

```
<210> SEQ ID NO 44
<211> LENGTH: 21
<212> TYPE: PRT
<213> ORGANISM: Artificial Sequence
<220> FEATURE:
<223> OTHER INFORMATION: Synthetic Construct

<400> SEQUENCE: 44

Arg Arg Arg Gln Arg Arg Lys Lys Arg Gly Tyr Asp Glu Met Glu Gln
1               5                   10                  15

Ala Asp Gln Arg Arg
            20

<210> SEQ ID NO 45
<211> LENGTH: 23
<212> TYPE: PRT
<213> ORGANISM: Artificial Sequence
<220> FEATURE:
<223> OTHER INFORMATION: Synthetic Construct

<400> SEQUENCE: 45

Arg Arg Arg Gln Arg Arg Lys Lys Arg Gly Tyr Asn Thr Gln Ala Leu
1               5                   10                  15

Ala His Thr Gly Glu Val His
            20
```